US008312508B2

(12) United States Patent
Ebata

(10) Patent No.: US 8,312,508 B2
(45) Date of Patent: Nov. 13, 2012

(54) INFORMATION PROCESSING APPARATUS, OPERATION PERMISSION GENERATING METHOD, OPERATION PERMISSION GENERATION DETERMINING METHOD, OPERATION PERMISSION GENERATING PROGRAM PRODUCT AND COMPUTER-READABLE RECORDING MEDIUM, AND GENERATION PERMISSION DETERMINING PROGRAM PRODUCT AND COMPUTER-READABLE RECORDING MEDIUM

(75) Inventor: Jun Ebata, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 1664 days.

(21) Appl. No.: 11/111,879

(22) Filed: Apr. 22, 2005

(65) Prior Publication Data
US 2005/0246620 A1 Nov. 3, 2005

(30) Foreign Application Priority Data

Apr. 28, 2004 (JP) .................................. 2004-134403
Feb. 21, 2005 (JP) .................................. 2005-044527

(51) Int. Cl.
*G06F 7/04* (2006.01)
(52) U.S. Cl. ...................... 726/2; 726/6; 726/8; 726/10
(58) Field of Classification Search ................ 726/2–10, 726/16–21, 26–30; 707/999.001–999.006, 707/999.009; 358/1.1
See application file for complete search history.

(56) References Cited

U.S. PATENT DOCUMENTS

| | | | | |
|---|---|---|---|---|
| 5,715,403 A | * | 2/1998 | Stefik | 705/44 |
| 5,911,143 A | * | 6/1999 | Deinhart et al. | 1/1 |
| 5,941,947 A | * | 8/1999 | Brown et al. | 709/225 |
| 6,023,765 A | * | 2/2000 | Kuhn | 726/4 |
| 6,070,171 A | * | 5/2000 | Snyder et al. | 707/203 |
| 6,076,166 A | * | 6/2000 | Moshfeghi et al. | 726/4 |

(Continued)

FOREIGN PATENT DOCUMENTS

JP 2002-91816 3/2002

(Continued)

OTHER PUBLICATIONS

Gligor, Virigil D. et al. "On the Formal Definition of Separation-of-Duty Policies and their Composition," IEEE Symposium on Security and Privacy, Oakland, Calif., May 1998, pp. 172-182.*

(Continued)

*Primary Examiner* — Darren B Schwartz
(74) *Attorney, Agent, or Firm* — Oblon, Spivak, McClelland, Maier & Neustadt, L.L.P.

(57) ABSTRACT

In an information processing apparatus for generating an operation permission specifying an application subject for a permission determination of an operation based on a subject of the operation, a resource to be a subject for the operation, and a type of the operation, an operation permission managing part manages the operation permission, and an operation permission generating part generates the operation permission for each combination of one or more categories of the subject, one or more categories of the resource, and one or more types of the operation, which are indicated as the application subject of the operation permission in a generation request, in response to the generation request of the operation permission, and a duplication detecting part detects a duplication of the application subject with an existing operation permission registered in the operation permission data managing part, with respect to the operation permission for each combination.

25 Claims, 24 Drawing Sheets

U.S. PATENT DOCUMENTS

| | | | |
|---|---|---|---|
| 6,412,070 B1* | 6/2002 | Van Dyke et al. | 726/17 |
| 6,772,350 B1* | 8/2004 | Belani et al. | 726/2 |
| 6,880,005 B1* | 4/2005 | Bell et al. | 709/225 |
| 7,409,447 B1* | 8/2008 | Assadzadeh | 709/225 |
| 2001/0021926 A1* | 9/2001 | Schneck et al. | 705/54 |
| 2002/0026592 A1* | 2/2002 | Gavrila et al. | 713/201 |
| 2002/0077803 A1 | 6/2002 | Kudoh et al. | |
| 2003/0105721 A1* | 6/2003 | Ginter et al. | 705/54 |
| 2003/0140243 A1* | 7/2003 | Nusser et al. | 713/200 |
| 2005/0028006 A1* | 2/2005 | Leser et al. | 713/200 |
| 2005/0055573 A1* | 3/2005 | Smith | 713/201 |
| 2005/0146966 A1 | 7/2005 | Kawamura | |
| 2005/0262572 A1* | 11/2005 | Yoneyama | 726/27 |
| 2006/0059567 A1* | 3/2006 | Bird et al. | 726/27 |

FOREIGN PATENT DOCUMENTS

| | | |
|---|---|---|
| JP | 2003-150751 | 5/2003 |
| JP | 2004-234272 | 8/2004 |

OTHER PUBLICATIONS

Botha, R.A. et al. "Separation of duties for access control enforcement in workflow environments," 2001, IBM Systems Journal, vol. 40, No. 3, pp. 666-682.*

Kuhn, D. Richard. "Mutual Exclusion of Roles as a Means of Implementing Separation of Duty in Role-Based Access Control Systems," 1997.*

Office Action issued Sep. 7, 2010, in Japan Patent Application No. 2005-044527.

* cited by examiner

FIG.1 PRIOR ART

| USER CATEGORY | TOP SECRET | SECRET | INTERNAL USE ONLY |
|---|---|---|---|
| RELATED PARTIES | REFER : NO<br>—<br>PRINT : NO<br>—<br>EDIT : NO<br>—<br>DELETE : NO<br>— | REFER : YES<br>LOG RECORD<br>PRINT : YES<br>GROUND PATTERN & LOG RECORD<br>EDIT : NO<br>—<br>DELETE : NO<br>— | REFER : YES<br>LOG RECORD<br>PRINT : YES<br>LOG RECORD<br>EDIT : NO<br>—<br>DELETE : NO<br>— |
| OUTSIDE PARTIES | REFER : NO<br>—<br>PRINT : NO<br>—<br>EDIT : NO<br>—<br>DELETE : NO<br>— | REFER : NO<br>—<br>PRINT : NO<br>—<br>EDIT : NO<br>—<br>DELETE : NO<br>— | REFER : YES<br>LOG RECORD<br>PRINT : YES<br>LOG RECORD<br>EDIT : NO<br>—<br>DELETE : NO<br>— |

FIG.2 PRIOR ART

| SUBJECT USER | SUBJECT DOCUMENT | SUBJECT OPERATION | OBLIGATION | PERMIT EXPIRATION | ... |
|---|---|---|---|---|---|
| RELATED PARTIES | ANY | PRINT | LOG RECORD | 2004/10/10 | ... |
| RELATED PARTIES | SECRET | PRINT | SECRET PRINT | 2004/10/2 | ... |
| .. | .. | .. | .. | .. | .. |

| SUBJECT USER | SUBJECT DOCUMENT | SUBJECT OPERATION | OBLIGATION | |
|---|---|---|---|---|
| RELATED PARTIES | TOP SECRET | REFER | LOG RECORD | ... |
| RELATED PARTIES | TOP SECRET | PRINT | SECRET PRINT | ... |
| RELATED PARTIES | SECRET & INTERNAL USE ONLY | REFER & PRINT | ... | ... |
| ... | ... | ... | ... | ... |

| ID | BASIC INFORMATION ||| DETAILED INFORMATION |||| GROUP ID | PRIORITY ORDER |
|---|---|---|---|---|---|---|---|---|
| | SUBJECT USER | SUBJECT DOCUMENT | SUBJECT OPERATION | REQUEST ORIGINATOR ID | ISSUED DATE | OTHER ATTRIBUTES | | |
| A1 | RELATED PARTIES | TOP SECRET | PRINT | K33 | 2004.09.23 | | A | 1 |
| A2 | RELATED PARTIES | SECRET | PRINT | K33 | 2004.09.23 | | A | 1 |
| A3 | RELATED PARTIES | INTERNAL USER ONLY | PRINT | K33 | 2004.09.23 | | A | 1 |
| A4 | REGULAR EMPLOYEES | TOP SECRET | PRINT | K33 | 2004.09.23 | | A | 1 |
| A5 | REGULAR EMPLOYEES | SECRET | PRINT | K33 | 2004.09.23 | | A | 1 |
| A6 | REGULAR EMPLOYEES | INTERNAL USER ONLY | PRINT | K33 | 2004.09.23 | | A | 1 |
| B0 | USER CATEGORY =ANY | SECRET & INTERNAL USER ONLY | REFER& PRINT | L07 | 2004.09.23 | | B | — |

| ID | BASIC INFORMATION | | | DETAILED INFORMATION | | | | GROUP ID | PRIORITY ORDER |
|---|---|---|---|---|---|---|---|---|---|
| | SUBJECT USER | SUBJECT DOCUMENT | SUBJECT OPERATION | REQUEST ORIGINATOR ID | ISSUED DATE | OTHER ATTRIBUTES | | | |
| A1 | RELATED PARTIES | TOP SECRET | PRINT | K33 | 2004.09.23 | | | A | 1 |
| A2 | RELATED PARTIES | SECRET | PRINT | K33 | 2004.09.23 | | | A | 1 |
| A3 | RELATED PARTIES | INTERNAL USER ONLY | PRINT | K33 | 2004.09.23 | | | A | 1 |
| A4 | REGULAR EMPLOYEES | TOP SECRET | PRINT | K33 | 2004.09.23 | | | A | 1 |
| A5 | REGULAR EMPLOYEES | SECRET | PRINT | K33 | 2004.09.23 | | | A | 1 |
| A6 | REGULAR EMPLOYEES | INTERNAL USER ONLY | PRINT | K33 | 2004.09.23 | | | A | 1 |
| B1 | RELATED PARTIES | SECRET | PRINT | L07 | 2004.09.23 | | | B | - |
| B2 | RELATED PARTIES | INTERNAL USER ONLY | PRINT | L07 | 2004.09.23 | | | B | - |
| B3 | OUTSIDE PARTIES | SECRET | PRINT | L07 | 2004.09.23 | | | B | - |
| B4 | OUTSIDE PARTIES | INTERNAL USER ONLY | PRINT | L07 | 2004.09.23 | | | B | - |

| DUPLICATED PERMIT LIST | | | | | | | |
|---|---|---|---|---|---|---|---|
| USER NAME | PERMIT CONTENTS | DETAILS | PERMIT REASON | DOCUMENT CATEGORY | SUBJECT DOCUMENT | PERMIT EXPIRATION | INSERTION PRIORITY |
| USER A | PRINT | DETAILS | TO PREPARE HADOUTS FOR CLIENT | ... | 00325 | 2004/10/10 | ○ |
| RELATED PARTIES | PRINT | DETAILS | FOR MAINTENANCE OPERATION | — | INTERNAL USE ONLY | 2004/10/3 | ⦿ |
| | | | | | | | ○ |

410 — 411 — 413

PRIORITY
HIGH ⇅ LOW

| SUBJECT PERMIT | | | | | | |
|---|---|---|---|---|---|---|
| USER NAME | PERMIT CONTENTS | DETAILS | PERMIT REASON | DOCUMENT CATEGORY | SUBJECT DOCUMENT | PERMIT EXPIRATION |
| | PRINT | DETAILS | FOR AUDIT | ... | INTERNAL USE ONLY | 2004/10/10 |
| RELATED PARTIES | | | | | | |

412

[ OK ] 414   [ CANCEL ] 415

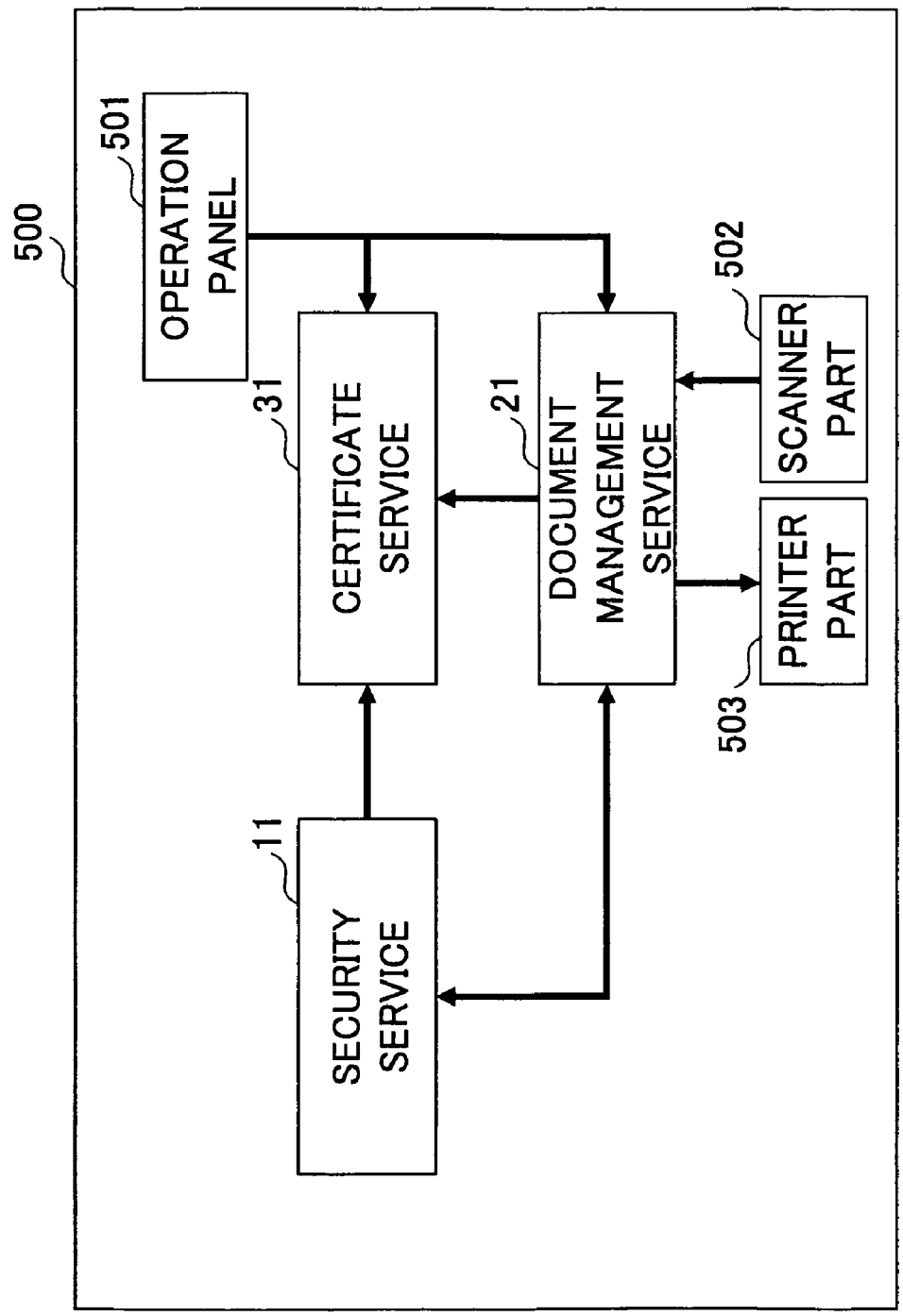

INFORMATION PROCESSING APPARATUS, OPERATION PERMISSION GENERATING METHOD, OPERATION PERMISSION GENERATION DETERMINING METHOD, OPERATION PERMISSION GENERATING PROGRAM PRODUCT AND COMPUTER-READABLE RECORDING MEDIUM, AND GENERATION PERMISSION DETERMINING PROGRAM PRODUCT AND COMPUTER-READABLE RECORDING MEDIUM

BACKGROUND OF THE INVENTION

1. Field of the Invention

The present invention generally relates to information processing apparatuses, operation permission generating methods, operation permission generation determining method, operation permission generating program products and computer-readable recording media, and generation permission determining program products and computer-readable recording media, and more particularly to an information processing apparatus, an operation permission generating method, a generation permission determining method, an operation permission generating program product and computer-readable medium, and a generation permission determining program product and computer-readable recording medium, in which operation permission used to determine an operation permit with respect to a resource are generated.

2. Description of the Related Art

Conventionally, in order to conduct an access control with respect to a document management system, an operation permit list, which is called as an ACL (Access Control List), is set for each document or each group formed by a set of a plurality of documents, and a security rule, which shows which user is allowed access to which operation, is managed. However, since the ACL is managed inside each system (for example, the ACL is managed as management information in a document management database), it is difficult to apply a rule based on a standardized policy universally for a plurality of systems.

In order to maintain a consistency of the access control with respect to a resource such as a document or a like over a wider range in addition to a single system, Japanese Laid-open Patent Application No. 2003-150751 discloses that information (hereinafter, called "access control information") concerning the access control in the plurality of systems is collected to a single security server, and each application determines each of various operations to permit based on an access control policy (security policy), which is unified in the security server. However, since an operation subject to control is different for an application, when the access control information is simply collected from the plurality of systems, the management information is not consistent. Accordingly, in the security server, the security policy is defined with a higher abstract degree. When a detailed determination is individually conducted, the access control is conducted by applying the most suitable policy description for each application in a policy description defining an access control for each abstract operation (for example, a process of "print out" and a process of "download to a local PC" determine based on a policy of "document output rule" whether or not their executions are permitted, respectively.

FIG. 1 is a diagram showing conventional definition contents of the security policy. As shown in a table 500 in FIG. 1, in the security policy, an operation is defined to be permitted or not (YES or NO) for each type (refer, print, edit, delete, and a like) of operations based on combinations of categories (related parties or outside parties) of subjects and categories (sensitivity levels) of resources (documents). In addition, contents of an obligation are shown in a row immediately under a row showing whether the operation is permitted. Accordingly, for example, referring to the table 500, related parties are permitted to refer to a secret document, but in this case, a log must be recorded. As described above, it is possible to comprehensively define each permission of various operations based on the combination of the categories of the subject and the categories of the resources. However, since the security policy is a common rule with respect to the plurality of systems, the contents of definitions tend to be fixed. Thus, it is difficult to flexibly correspond an exceptional event, which may occur in a routine work, (for example, a case in that an operation authority for a specific document is temporarily granted to a temporary employee).

On the other hand, the following method is considered. Instead of comprehensively defining access control information such as the security policy, by a configuration in that an operation authority is given corresponding to a progress of a business, every time a specific operation for a specific document is permitted to a specific user with an approval, data (hereinafter, called "permit") showing that the specific operation is permitted is generated, and the access control is conducted based on the permit.

FIG. 2 is a diagram showing an example of a conventional permit. In a table 510 in FIG. 2, each row shows one permit. As shown in FIG. 2, the permit is formed by information of a subject user, a subject document, a subject operation, an obligation, a permit expiration, and a like. The subject user, the subject document, and the subject operation show a user, a document, an operation, which are subject to the permit, respectively. The obligation shows an obligation imposed when an operation allowed by the permit is conducted. The permit expiration shows expiration showing a date until the operation is allowed by the permit. The permit on the first row defines that related parties are allowed to print out any document (ANY) having any sensitivity level by Oct. 10, 2004. In this case, the permit also defines that it is required to record a log. In FIG. 2, the subject user and the subject document are specified by the categories of the user and the categories of the document shown in FIG. 1. For example, a user and a document can be subjects by specifying the subject user and the subject document by using a user ID and a document ID.

In a method using the permit, it is possible to realize a flexible access control so as to easily grant a necessary authority if necessary.

Since each permit is independently issued and is not generated based on a uniform rule, as a result of issuing the plurality of permits, subjects of some permits interfere with each other. For example, as compared the permit of the first row (hereinafter, called a "permit 1") with the permit of the second row (hereinafter, called a "permit 2"), subject users of both permits are "related parties", and the subject operations are "print". Moreover, the subject document of "permit 1" is defined as "ANY" (all categories), so that a range of the subject document includes the subject document of "permit 2". Accordingly, both permits are duplicated on a point of defining an print operation with a secret document of the related parties as the subject document. In this case, it becomes a problem to determine which definition should have a higher priority, or whether or not definitions of both permits are combined. For example, it is a problem to determine which one of obligations should be applied to an interfered portion or whether or not a logical addition of the obligations of both permits should be applied to the interfered portion.

It is assumed that a priority order is defined between the permits interfering with each other. FIG. 3 is a diagram showing a conventional case in that permits interferes with each other. In FIG. 3, three permits 510, 520, and 530 interferes with each other. That is, the permits 510 and 530 are duplicated in a range A, three permits 510, 520, and 530 are duplicated in a range B, the permits 510 and 520 are duplicated in a range C, and the permits 520 and 530 are duplicated in a range D. Accordingly, in these duplicated ranges, it is required to define a priority of the permits 510, 520, and 530.

However, if each of the permits 510, 520, and 530 are used as one permit unit and a priority order is defined by one permit unit, the priority order is fixed in each of ranges A, B, and C. For example, if the priority order is defined to be as an order of the permit 510, 520, and 530, the permit 510 has a priority in all ranges A, B, and C.

SUMMARY OF THE INVENTION

It is a general object of the present invention to provide information processing apparatuses, operation permission generating methods, generation permission determining methods, operation permission generating program products and computer-readable recording media, and generation permission determining program products and computer-readable recording media, in which the above-mentioned problems are eliminated.

A more specific object of the present invention is to provide an information processing apparatus, an operation permission generating method, an operation permission generation determining method, an operation permission generating program product and computer-readable medium, and a generation permission determining program product and computer-readable recording medium, in which an access control is properly adjusted when information concerning the access control is duplicated and defined.

The above objects of the present invention are achieved by an information processing apparatus for generating an operation permission specifying an application subject for a permission determination of an operation based on a subject of the operation, a resource to be a subject for the operation, and a type of the operation, the information processing apparatus including: an operation permission managing part managing the operation permission; an operation permission generating part generating the operation permission for each combination of one or more categories of the subject, one or more categories of the resource, and one or more types of the operation, which are indicated as the application subject of the operation permission in a generation request, in response to the generation request of the operation permission; and a duplication detecting part detecting a duplication of the application subject with an existing operation permission registered in the operation permission data managing part, with respect to the operation permission for each combination.

According to the present invention, in the information processing apparatus, the operation permission to be generated is divided for each combination of the category of the subject of the operation, the category of the resource, and the type of the operation. Therefore, it is possible to detect the duplication of the application subject by a detailed unit.

The above objects of the present invention can be achieved by a program product for causing a computer to conduct processes described above in the information processing apparatus or by a computer-readable recording medium recorded with the program.

The above objects of the present invention are achieved by information processing apparatus for determining a permission of a generation of an operation permission specifying an application subject for a permission determination of an operation based on a subject of the operation, a resource to be a subject for the operation, and a type of the operation, including: an operation permission managing part managing the operation permission; a determining part determining whether or not more than one category of the subject, more than one category of the resource, or more than one type of the operation are indicted as the application subject of the operation permission, which is to be generated; and a duplication detecting part detecting a duplication of the application subject for the operation permission and an existing operation permission registered to the operation permission managing part, when the determining part determines that more than one category of the subject, more than one category of the resource, and more than one type of the operation are not indicted as the application subject of the operation permission, wherein when the determining part determines that more than two categories of the subject, more than two categories of the resource, or more than two types of the operation is indicted as the application subject of the operation permission, or when the duplication of the application subject is detected by the duplication detecting part, the operation permission is not generated.

According to the present invention, in the information processing apparatus, it is possible to prevent the generation of the operation permission in which the application subject is possible to be duplicated with the application subjects of other permission.

The above objects of the present invention can be achieved by a program product for causing a computer to conduct processes described above in the information processing apparatus or by a computer-readable recording medium recorded with the program.

BRIEF DESCRIPTION OF THE DRAWINGS

In the following, embodiments of the present invention will be described with reference to the accompanying drawings.

FIG. 1 is a diagram showing conventional definition contents of the security policy;

FIG. 2 is a diagram showing an example of a conventional permit;

FIG. 8 is a diagram showing a configuration of a permit management table according to the present invention;

FIG. 17 is a diagram showing a configuration of the permit management table according to the second embodiment of the present invention;

FIG. 20 is a diagram showing the permit management table after the requested permit is divided, according to the second embodiment of the present invention;

FIG. 23 is a diagram showing a display example of a priority order setting screen according to the second embodiment of the present invention; and FIG. 24 is a diagram showing a configuration of a apparatus implementing various services according to a third embodiment of the present invention.

DESCRIPTION OF THE PREFERRED EMBODIMENTS

Figure 3:
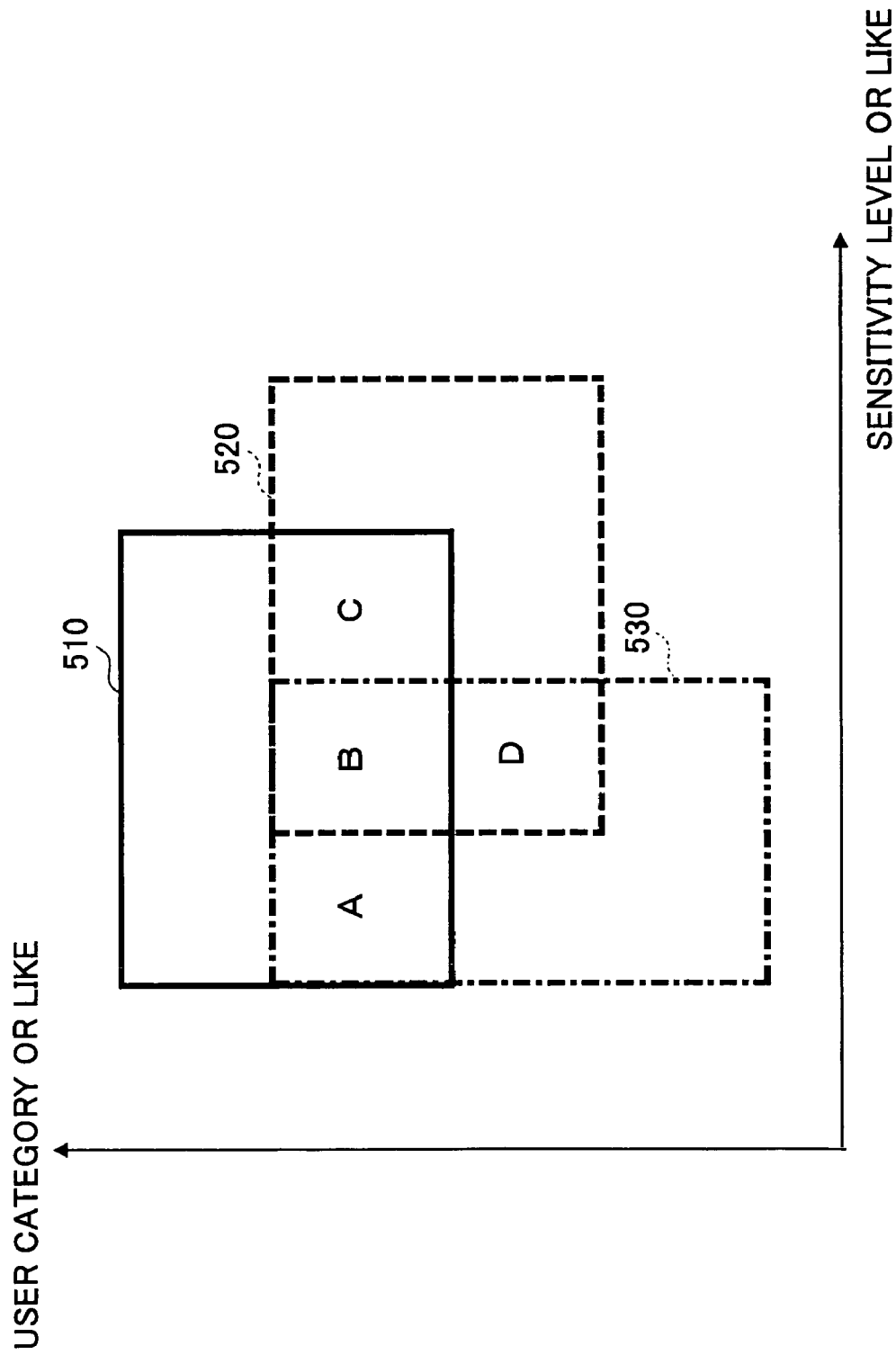
FIG. 3 is a diagram showing a conventional case in that permits interferes with each other.
Figure 4:
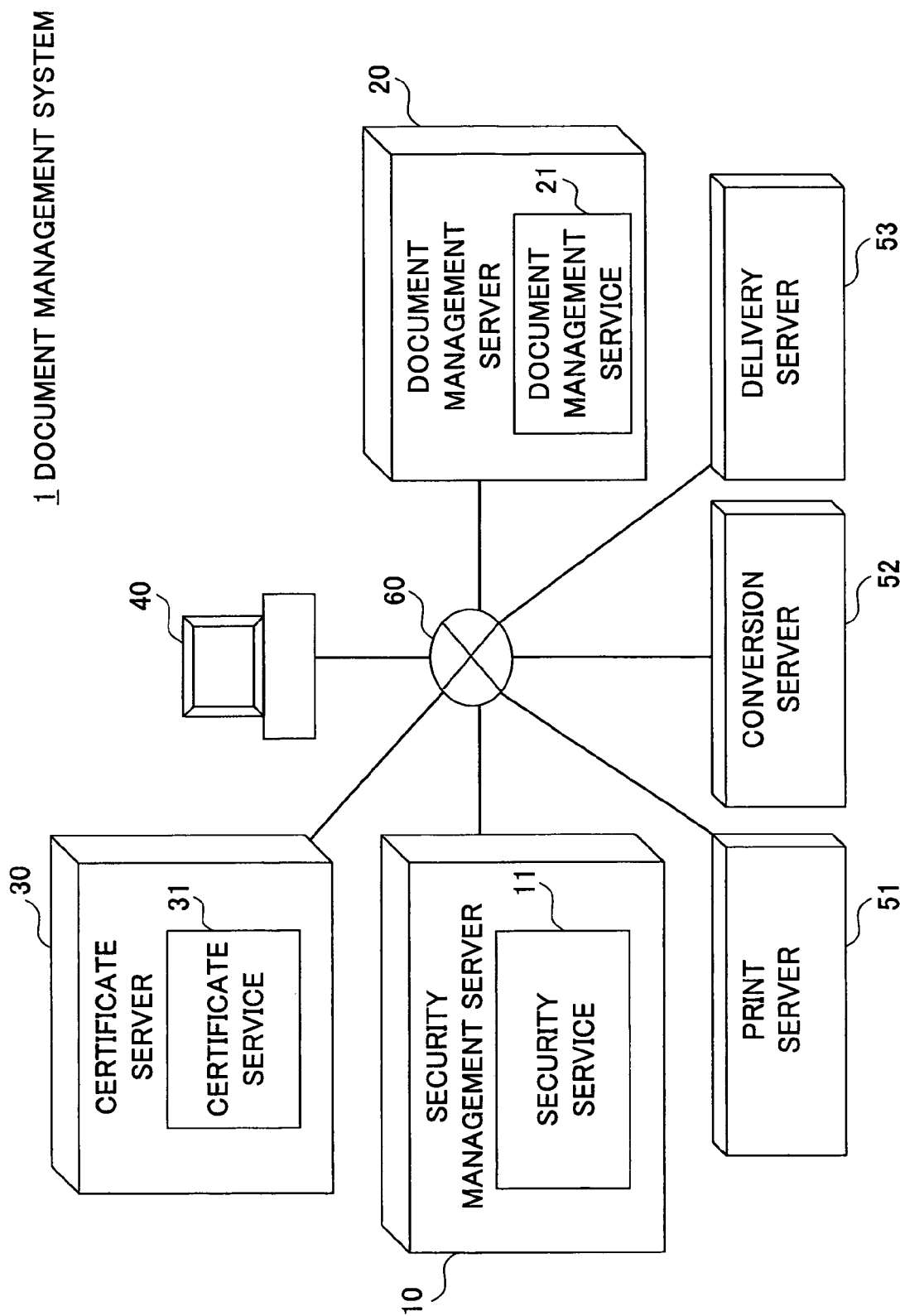
FIG. 4 is a diagram showing a configuration of a document management system according to the present invention.

In the following, embodiments of the present invention will be described with reference to the accompanying drawings. FIG. 4 is a diagram showing a configuration of a document management system according to the present invention. As shown in FIG. 4, the document management system 1 according to the present invention includes a security management server 10, a document management server 20, a certificate server 30, a client terminal 40, a print server 51, a conversion server 52, a delivery server 53, and a like, which are connected to each other through a network 60 such as the Internet, a LAN (Local Area Network), or a like.

The security management server 10 is a computer implementing a security service 11, which provides, as Web services, a management function for managing various information (hereinafter, called security information) for security of a document, and an operation permit determination function for determining based on the security information whether or not each of various operations (refer, print, edit, delete, and a like) is allowed for a document of a user. Each of various servers (the document management server 20, the print server 51, the conversion server 52, and the delivery server 53) for handling the document in the document management system 1 inquires the security service 11 so as to determine a presence of an operation authority with respect to the document of each user.

The document management server 20 is a computer implementing a document management service 21 that provides a document management function (providing means for storing a document, searching the document being stored, updating and deleting the document, and a like) as a Web service. The certificate server 30 is a computer implementing a certificate service 31 that provides, as a Web service, the certificate service 31 for certificating a user of the document management system 1. The certificate service 31 certificates a user in response to a certificate request. When the user is certificated, the certificate service 31 issues an electronic certificate (hereinafter, called a ticket) certifying that the user is certificated.

The print server 51, the conversion server 52, and the delivery server 53 are examples of various servers that handle the document being managed by the document management server 20. The print server 51 is a computer implementing a function for printing out the document from a printer. The conversion server 52 is a computer implementing a function for converting the document into a predetermined data format. The delivery server 53 is a computer implementing a function for deliver the document to a predetermined destination.

The client terminal 40 is a computer implementing an application using the functions of the above-described various servers. However, the client terminal 40 is not limited to a terminal which is actually used by a user. For example, the client terminal 40 can be a Web server. In this case, the application implemented to the client terminal 40 corresponds to a Web application.

Figure 5:
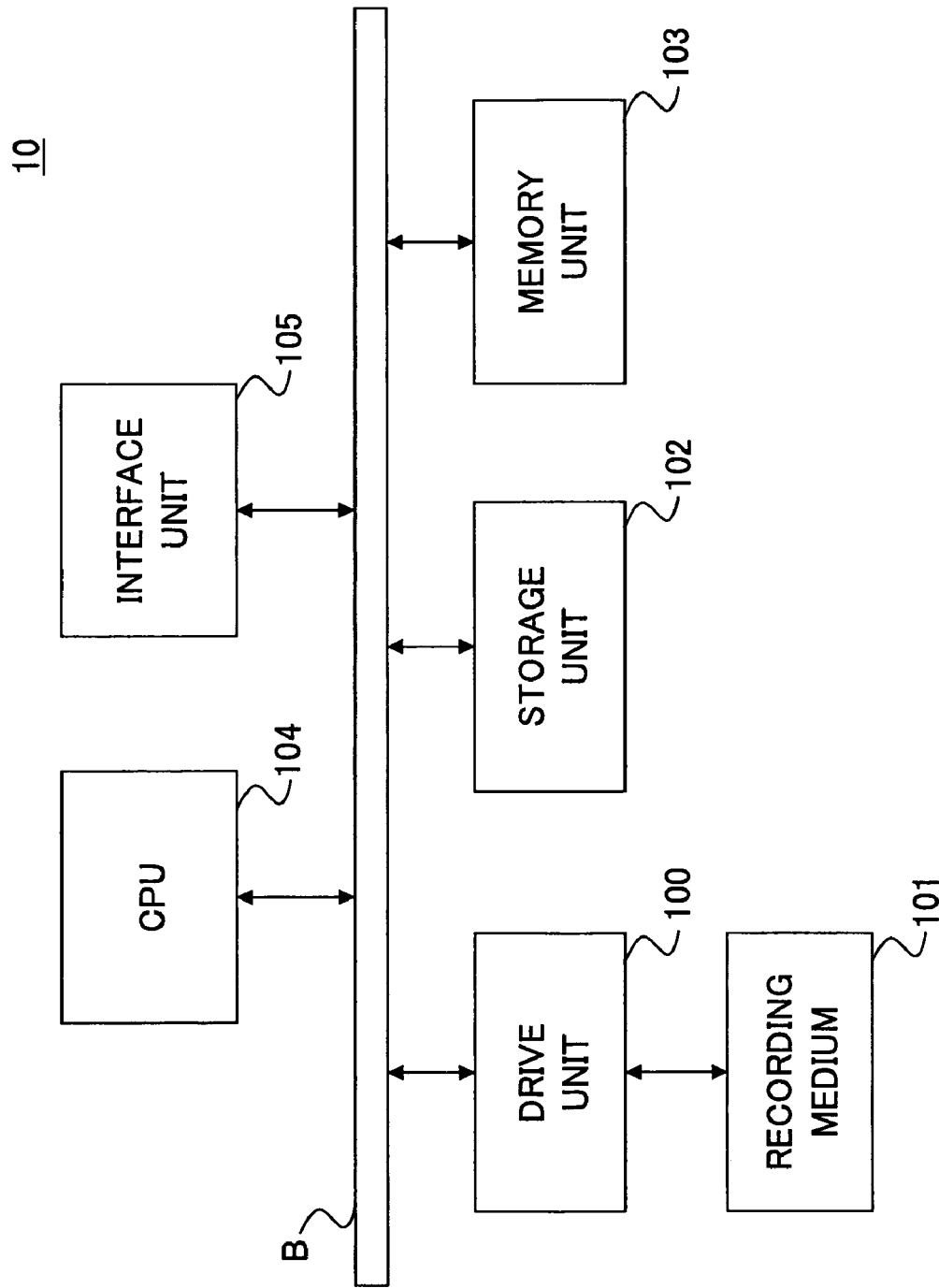
FIG. 5 is a diagram showing a hardware configuration of a security management server according to the present invention.

Next, the security management server 10 will be described in detail. FIG. 5 is a diagram showing a hardware configuration of the security management server according to the present invention. The security management server 10 in FIG. 5 includes a drive unit 100, a storage unit 102, a memory unit 103, a CPU (Central Processing Unit) 104, and an interface unit 105, which are mutually connected through a bus B.

A program realizing a process in the security management server 10 can be provided by a recording medium 101, for example, a CD-ROM (Compact Disk Read Only Memory) or a like. When the recording medium 101 recording the program is set to the drive unit 100, the program is installed into the storage unit 102 through the drive unit 100. The storage unit 102 stores the program being installed through the drive unit 100, and stores necessary files and data. The memory unit 103 reads out the program from the storage unit 102 when an instruction for activating the program is issued. The CPU 104 executes a function of the security management server 10 in accordance with the program stored in the memory unit 103. For example, the interface unit 105 includes a modem, a router, and a like, and is used to connect to the network 60 shown in FIG. 4.

Figure 6:
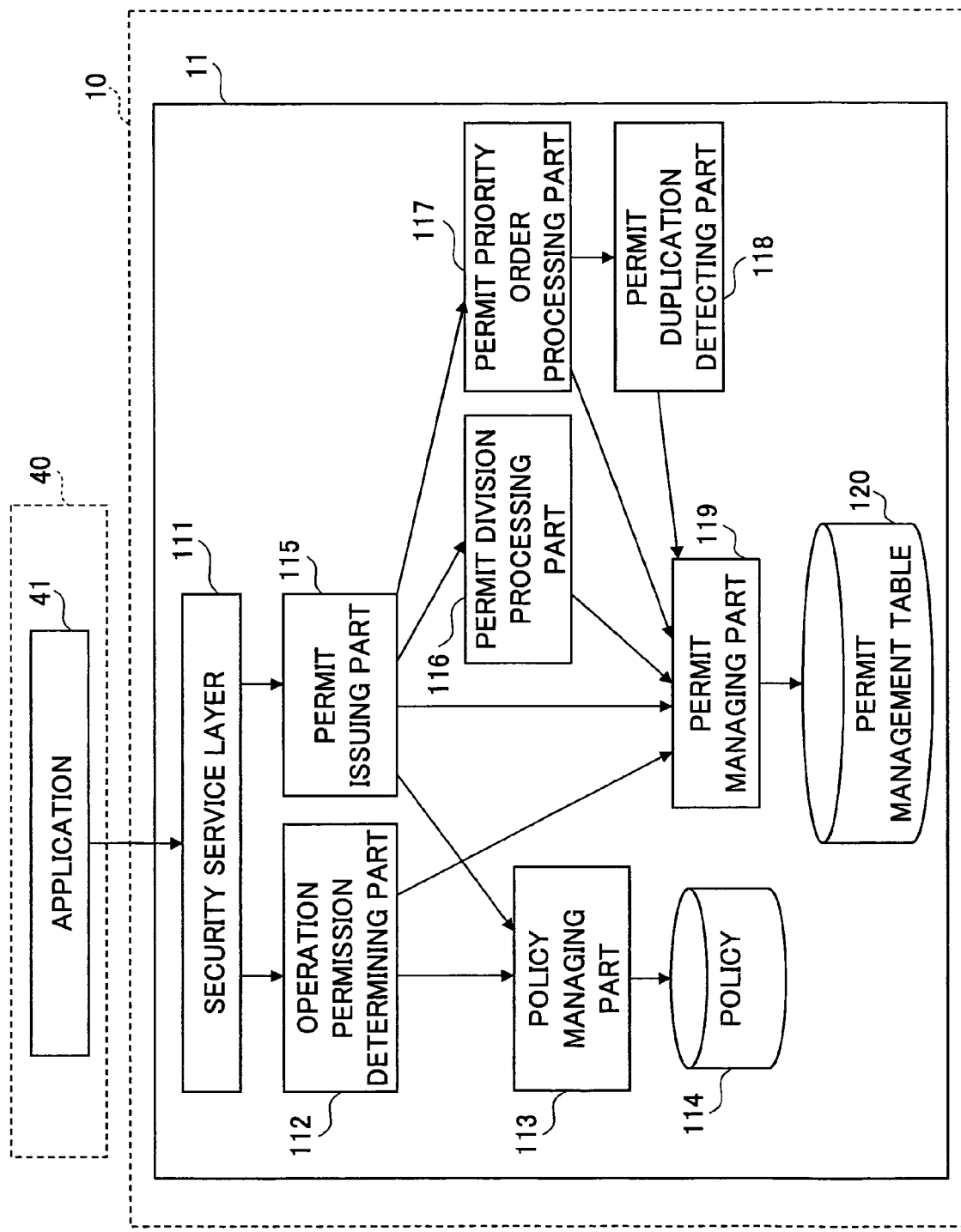
FIG. 6 is a diagram showing a functional configuration of the security management server according to the present invention.

FIG. 6 is a diagram showing a functional configuration of the security management server according to the present invention. As shown in FIG. 6, in the security management server 10, the security service 11 includes a security service layer 111, an operation permission determining part 112, a policy managing part 113, a policy 114, a permit issuing part 115, a permit division processing part 116, a permit priority order processing part 117, a permit duplication detecting part 118, a permit managing part 119, and a permit management table 120.

The security service layer 111 is a layer to open function of the security service 11 to a network. That is, the security service layer 111 analyses a SOAP (Simple Object Access Protocol) message sent from an application 41 of the client terminal 40, and determines a request received from an application 41. Based on a determination result, the security service layer 111 calls the operation permission determining part 112 or the permit issuing part 115 in order to execute a function requested by the application 41. The security service layer 111 also sends a process result returned from the operation permission determining part 112 or the permit issuing part 115 as a SOAP message to the application 41.

In response to the request from the application 41, the operation permission determining part 112 is a module implementing a function that conducts a permit determination with respect to each of various operations for a document of a user using the application 41 based on security information managed in the policy 114 and the permit management table 120. The policy managing part 113 is a module that provides an interface to an upper module (in this case, any one of the operation permission determining part 112 and the permit issuing part 115) in order to access the policy 114.

In a case in that the subject (user) operating a document is classified as information forming a part of the security information based on a predetermined standard, and also a resource (document) as a subject to be operated is classified based on a predetermined standard, the policy 114 is a file that defines a security rule (rule) for conducting the permit determination concerning each of various operation by corresponding to each combination of the categories of the subject (user) and the categories of the resource (document).

In the following embodiments of the present invention, it is assumed that a user is classified in a view point of a role, a user category, and a like; a document is classified in a view point of a document category, a sensitivity level, a document state, and a like; and the access control is conducted with respect to each of the various operations such as operations to refer, print out, delete, edit, and a like, based on the user category and the document category.

The role is a parameter used to classify a user based on a role (regular employee, manager, temporary employee, or a like) of the user in an organization such as a company to which the user belongs. The user category is a parameter used to classify a user based on information showing whether or not the user is related to the document. In the following embodiments of the present invention, in a case in that a section to which the user belongs is identical to a section to which the document is managed, the user is a person related to the document (related parties). In a case in that the user is a person who is not related to the document, the user is a person of outside parties.

The document category is a parameter used to classify the document based on contents of the document so as to classify the document into one of a design document, a patent document, a personnel document, minutes of a meeting, a regular document, and a like. The document state is a parameter used to classify the document based on a state showing a lifecycle of the document. For example, the document state shows one of a creation state, a completion state, a deletion state, and a like. The sensitivity level is a parameter used to classify the document based on a sensitivity degree of the document. For example, the sensitivity level shows one of a top secret, a secret, an internal use only, and a like.

Figure 7:
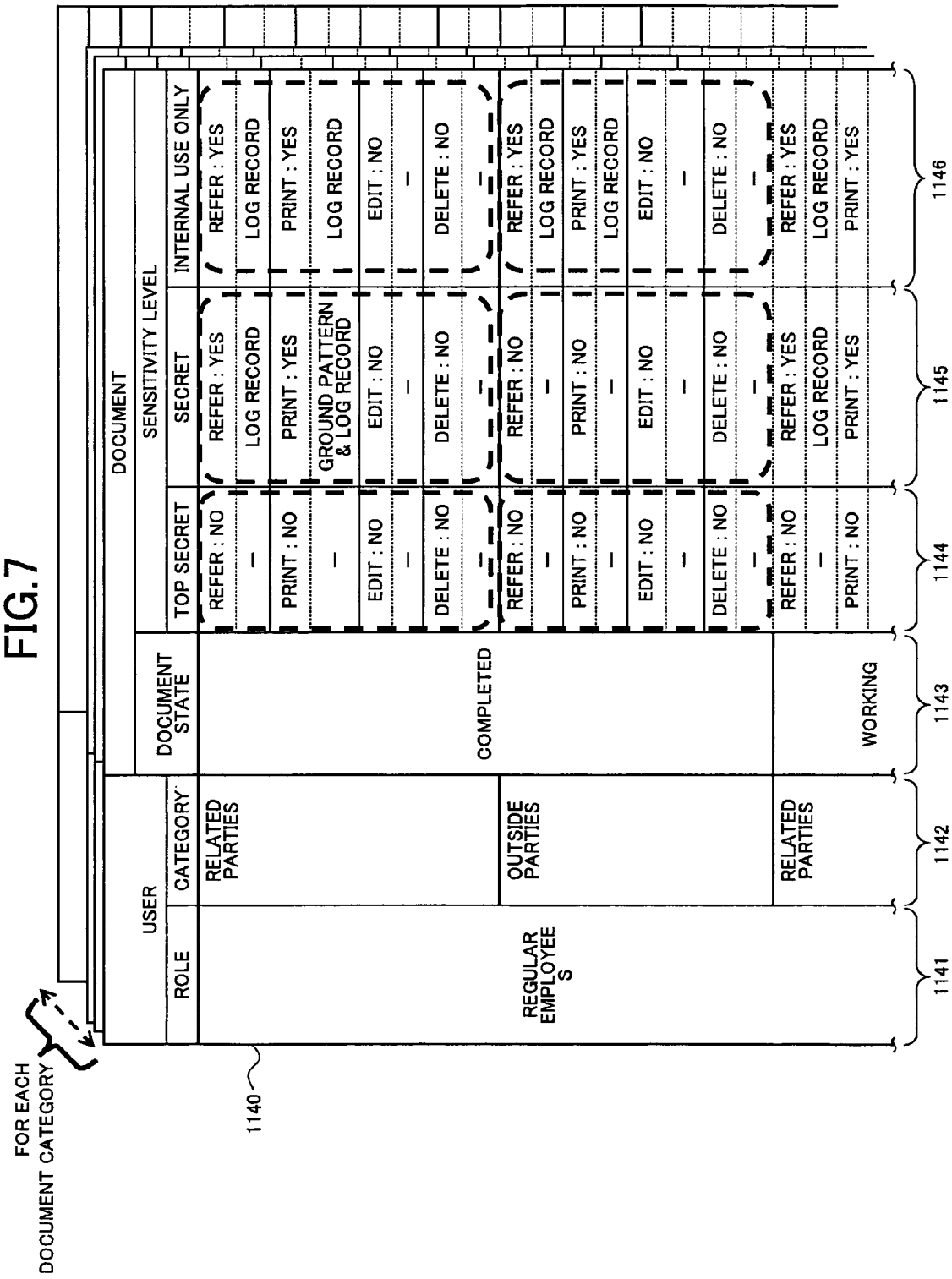
FIG. 7 is a diagram showing a concept of the definition contents of a policy according to the present invention.

In a case in that categories for the user and the document are defined in the above-viewpoint, for example, definition contents of the policy 114 can be ones as shown in FIG. 7. FIG. 7 is a diagram showing a concept of the definition contents of the policy according to the present invention. In a table 1140 in FIG. 7, the security rule is shown for the permit determination with respect to each of the various operations for each combination of the user categories and the document categories.

In the table 1140, the role, the user category, and the document state are specified by columns 1141, 1142, and 1143, respectively. In addition, security rules for documents of the top secret, the secret, and internal use only are assigned to columns 1144, 1145, and 1146, respectively.

In FIG. 7, each area surrounded by a dashed line shows a unit formed for each combination of parameters described above. For each unit, a presence of permission for each of the various operations is defined by showing "YES" (permitted) or "NO" (not permitted) beside an operation name. Furthermore, on a row under the operation name, contents of the obligation are defined to be imposed when the operation is conducted. Accordingly, for example, in the table 1140, in a case in that a document 1 is a secret document and a completed document, when a user A is a regular employee and is a person related to the document 1, the user A is allowed to refer to the document 1, but a log is required to record when the user A refers to the document 1.

Since the standard to classify the user and the document is simply shown by parameters, it is possible to use various standards depending on a circumstance of the organization and a system implemented to the organization. Accordingly, each standard can be approximately selected to meet an operation.

Referring to FIG. 6 again, the permit management table 120 is a table to manage each permit. FIG. 8 is a diagram showing a configuration of the permit management table according to the present invention. Data used as the permit do not comprehensively define the access control information beforehand such as the policy 114, but grant an operation authority corresponding to a progress of a business operation. For example, in a case in that a specific operation with respect to a specific document is allowed for a specific user by an approval or a like, the permit can describe contents of this approval.

One record (row) in a permit management table 120a in FIG. 8 corresponds to one permit. The permit includes items of a subject user, a subject document, a subject operation, an obligation, and a like. The subject user is an item for specifying a user who is to be an application subject of the permit. For example, one user is specified by using a user ID. Alternatively, a plurality of users belonging to each category or a like are specified as the subjects by using the role, the user category, or a combination of the role and the user category.

The subject document is an item for specifying a document as the application subject of the permit. For example, the document ID is set as the subject document to specify a single document. Alternatively, a plurality of documents may be specified as the application subject of the permit by the document category, the sensitivity level, document information, or a combination of the document category, the sensitivity level, and the document information. The subject operation is an item for specifying a type of an operation, which is to be allowed based on the permit. Accordingly, for example, a permit of the first row in the permit management table 120a is a permit for allowing the related parties to conduct a reference operation with respect to a secret document. However, according to the permit, when the related parties refer to the secret document, it is required to record a log.

Referring to FIG. 6 again, the permit issuing part 115 is a module implementing a control function (main process) of a permit generation process for generating a new permit in response to a permit issuance request from the application 41. The permit issuing part 115 generates an permit by using the permit division processing part 116, the permit priority order processing part 117, and the permit duplication detecting part 118. A generation of the permit is to register a new permit to the permit management table 120.

The permit division processing part 116 is a module implementing a determination process (division determination process) for determining whether or not the permit requested to issue is possible to be divided, and a function for executing a division process for dividing the permit capable of being divided. In the permit capable of being divided, at least one of the subject user, the subject document, and the subject operation of the permit is included in more than one category or type.

Figure 9:
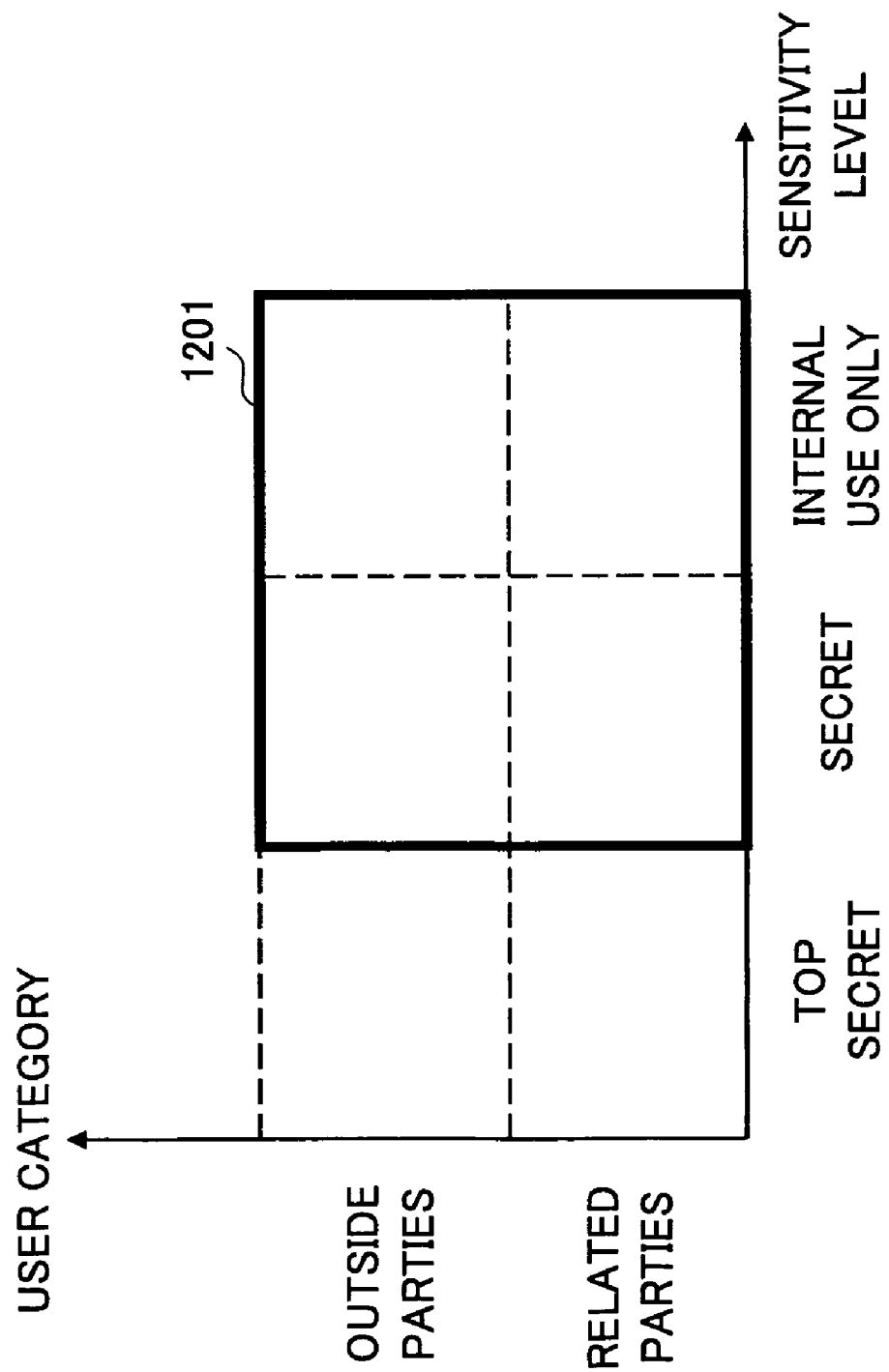
FIG. 9 is a diagram for explaining divisions of a permit according to the present invention.
Figure 10:
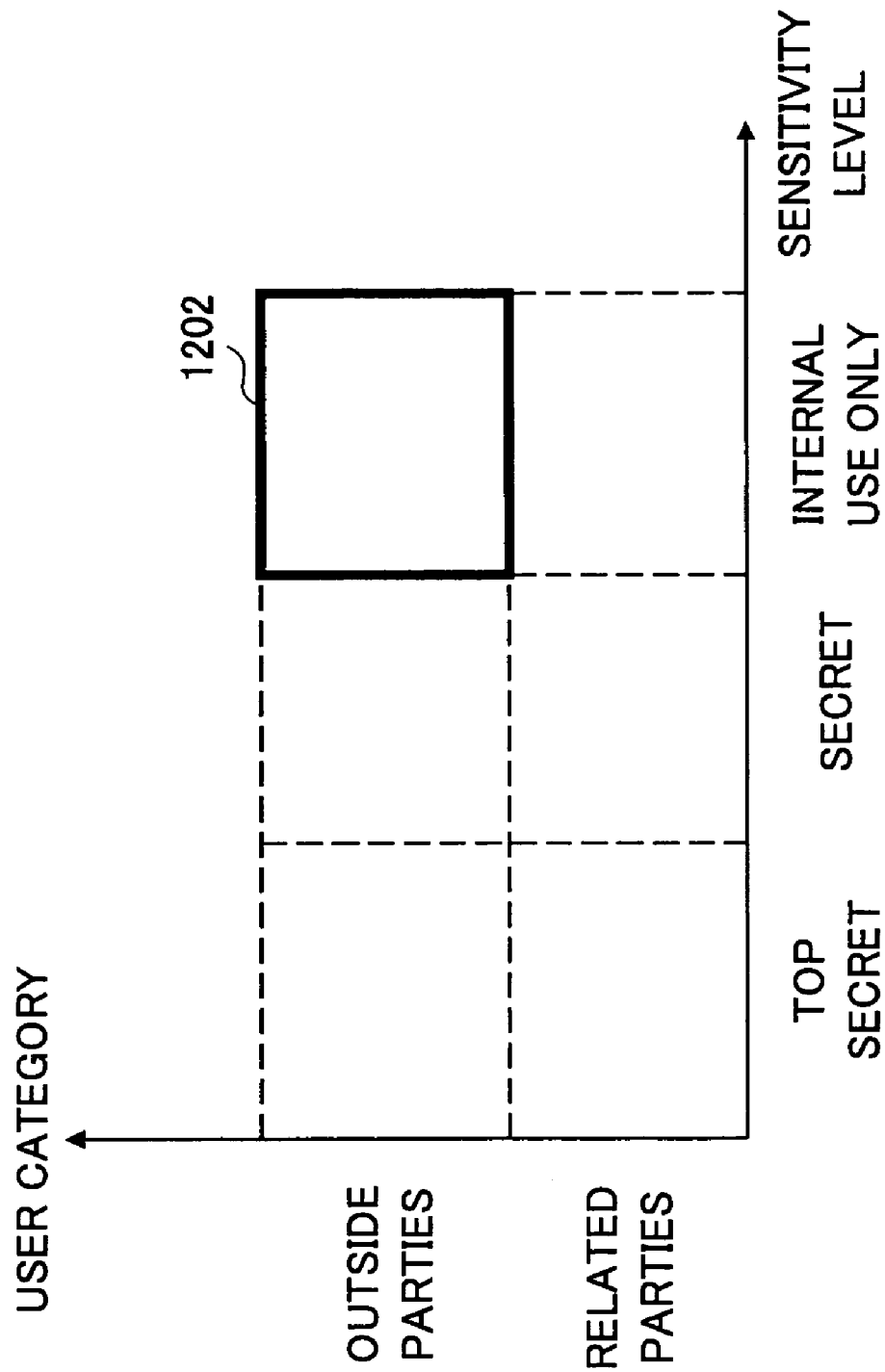
FIG. 10 is a diagram for explaining divisions of the permit according to the present invention.

FIG. 9 and FIG. 10 are diagrams for explaining divisions of the permit according to the present invention. In the following figures, coordinates (shown in FIG. 9, for example) represent the application subject of the permit. In the following figures, for convenience in explaining parameters, the application subject is simply specified by only parameters of the sensitivity level and the user categories.

For example, in the permit 1201 in FIG. 9, the related parties and the outside parties are defined as the subject users, and the secret document and the internal use only document are defined as the subject documents. Thus, both the subject user and the subject document are simultaneously included in two categories as the application subjects. Accordingly, it is determined that the permit 1201 is possible to be divided (into four divisions, for example) On the other hand, in the permit 1202 in FIG. 10, the outside parties are defined as the subject users, and the internal use only document is defined as the subject document. None of the outside parties and the internal use only document is included into two categories. Accordingly, it is determined that the permit 1202 cannot be divided.

Referring to FIG. 6, the permit priority order processing part 117 is a module implementing a function for determining to prioritize the permits having the same application subject when a part of or the entire application subject of the permit requested to issue is duplicated with another application subject of an existing permit.

The permit duplication detecting part 118 is a module implementing a function for detecting a duplication of the application subject between the permit requested to issue and the existing permit.

The permit managing part 119 is a module for providing an interface used to access the permit management table 120 to an upper module (in this case, the operation permission determining part 112, the permit issuing part 115, or the like).

[First Embodiment]

In the following, a process procedure of the security management server 10 in FIG. 6 will be described. As a first embodiment of the present invention, an example of preventing an issuance of the permit in that a part of or the entire application subject the permit duplicates with the existing permit when the security service 11 issues the permit will be described.

Figure 11:
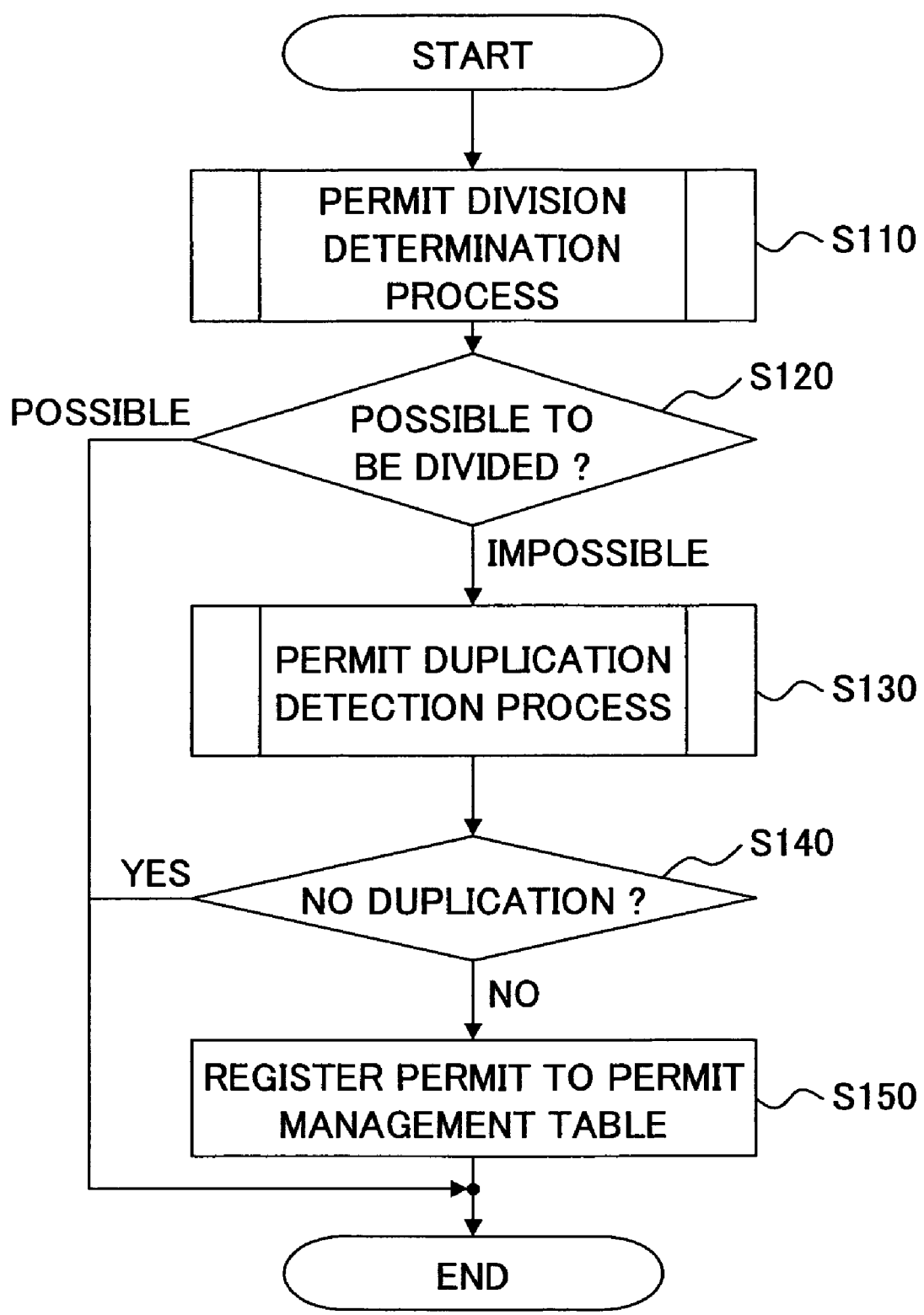
FIG. 11 is a flowchart for explaining a permit issuance process conducted by the security management server according to a first embodiment of the present invention.

FIG. 11 is a flowchart for explaining the permit issuance process conducted by the security management server according to the first embodiment of the present invention. The flowchart in FIG. 11 shows a process started when the security service layer 111, which accepts a permit issuance request from the application 41, instructs an issuance of the permit to the permit issuing part 115. The permit issuance request indicates the subject user, the subject document, the subject operation, and the like of the permit (hereinafter, called a requested permit) being requested to issue, based on respective categories.

In step S110, in response to an instruction from the permit issuing part 115, the permit division processing part 116 determines based on the indication of the subject user, the subject document, the subject operation, and the like with respect to the requested permit whether or not the requested permit is possible to be divided. In step S120 following the step S110, when a determination result by the permit division processing part 116 is "impossible to be divided", the permit issuing part 115 calls the permit. duplication detecting part 118. In response to a call from the permit issuing part 115, the permit duplication detecting part 118 executes a permit duplication detection process for detecting a duplication between the application subject of the requested permit and the application subject of the existing permit being registered in the permit management table 120 (step S130). When the duplication between the requested permit and the existing permit is not detected by the permit duplication detecting part 118 (No of step S140), the permit issuing part 115 permits to issue the requested permit, registers the requested permit to the permit management table 120a, and then terminates this process.

On the other hand, when the determination result of the permit division processing part 116 shows "possible to be divided" (No of the step S120), or when the permit duplication result detects the duplication between the requested permit and the existing permit (another permit) (Yes of the step S140), the permit issuing part 115 does not permit to issue the requested permit. That is, the permit issuing part 115 does not generate the requested permit and terminates this process.

A permit generated in the process shown in FIG. 11 is a permit in that all application subjects are impossible to be divided. That is, the permit generated in the process shown in FIG. 11 is a permit in that all application subjects are not duplicated with any permit. Therefore, according to the security management server 10 according to the first embodiment of the present invention, it is possible to prevent an issuance of the duplication of the application subject among the permits.

Figure 12:
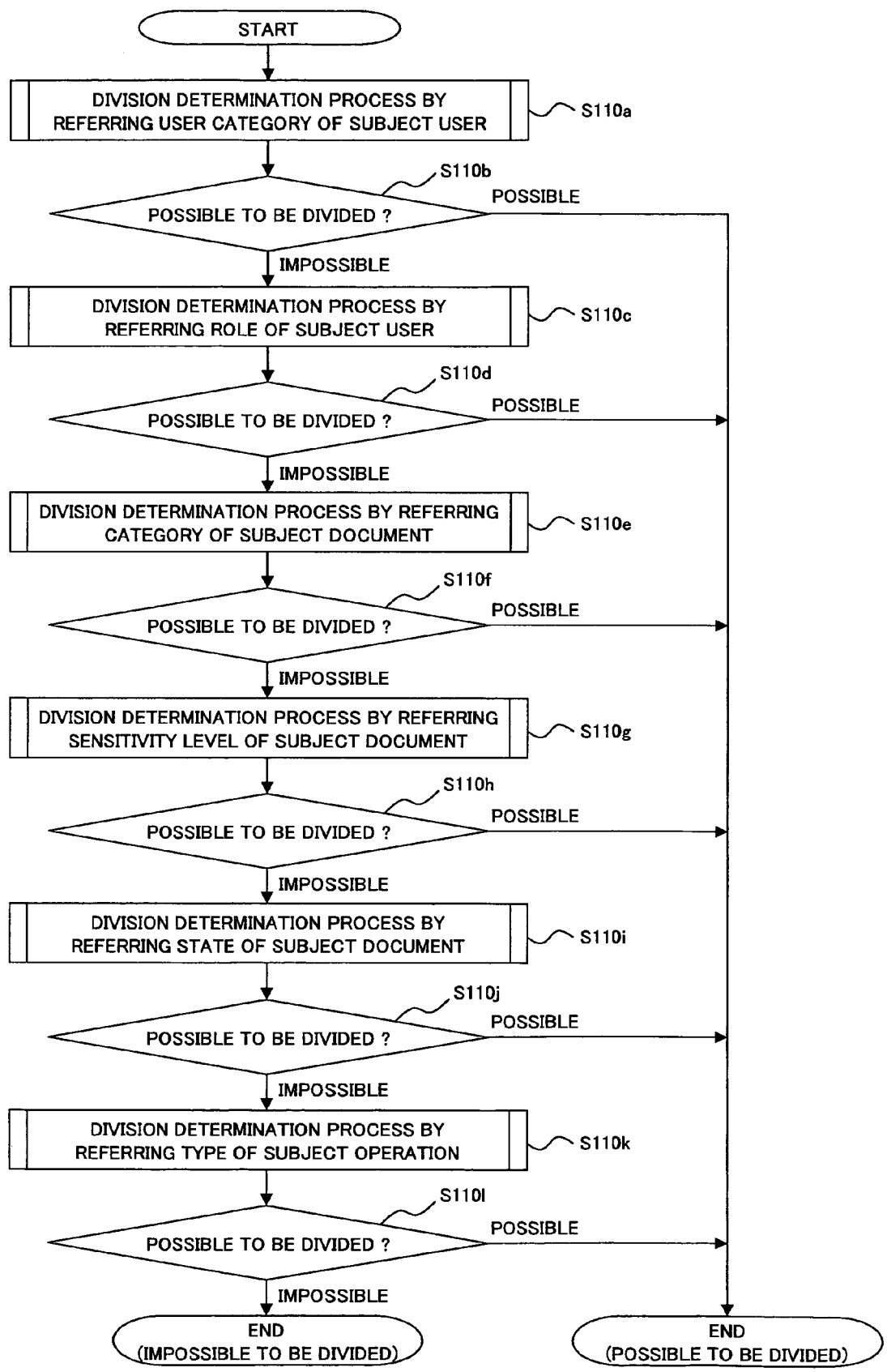
FIG. 12 is a flowchart for explaining a division determination process for the permit, which is conducted by a permit division processing part, according to the first embodiment of the present invention.

Next, the division determination process for the permit in the step S110 in FIG. 11 will be described in detail. FIG. 12 is a flowchart for explaining the division determination process for the permit, which is conducted by the permit division processing part, according to the first embodiment of the present invention.

Figure 13:
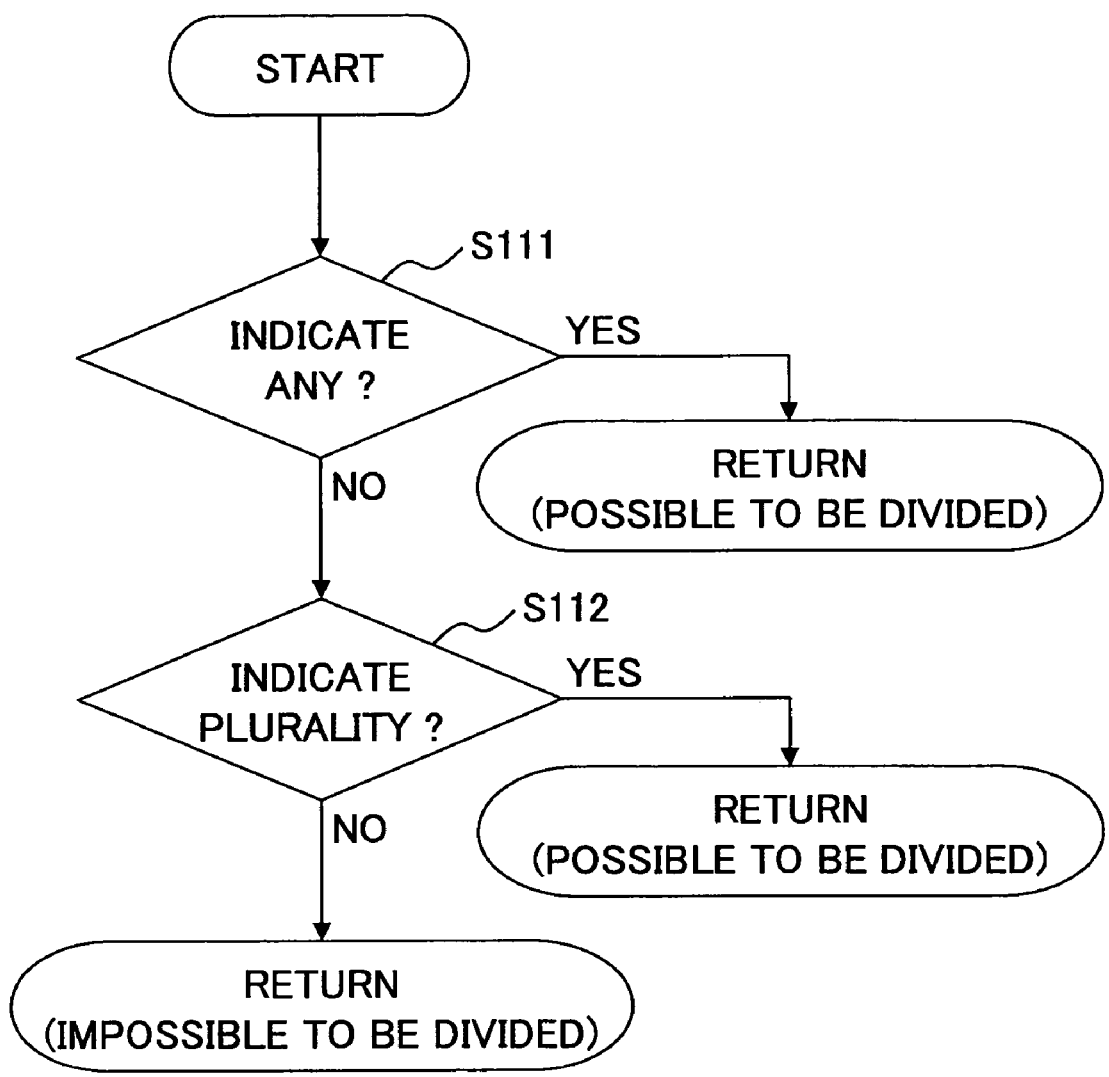
FIG. 13 is a flowchart for explaining a division determination process for each parameter, according to the first embodiment of the present invention.

In step S110a, based on the subject user of the requested permit, a division determination is conducted by referring to the user category. This division determination process is shown in FIG. 13 in detail. FIG. 13 is a flowchart for explaining the division determination process for each parameter, according to the first embodiment of the present invention.

First, it is determined whether or not "ANY" is set as a value of the user category for the subject user of the requested permit (step S111). In this case, a value "ANY" indicates all categories (including the related parties and the outside parties). When "ANY" is not indicted, it is determined whether or not a plurality of categories are indicated as a value of the user category (step S112). When the plurality of categories are not indicated, it is determined that the permit is impossible to be divided since the user category is not included in more than one category. On the other hand, when "ANY" is indicated (Yes of step S111) or when the plurality of categories is indicated (Yes of step S112), it is determined that the permit is possible to be divided.

Referring back to FIG. 12 again, when it is determined that the permit is possible to be divided (Yes of step S10b), the division determination process is returned with "possible to be divided" as a determination result. On the other hand, when it is determined that the permit is possible to be divided (No of S110b), in the following steps S110c, S110d, S110e, S110f, S110g, S110h, S110i, S110j, S110k, and S110l), the same division determination process shown in FIG. 13 is conducted for each of the role of the user, the document category, the sensitivity level, the document state, and the operation type as the parameters. It is determined that the permit is impossible to be divided, when "ANY" or the plurality of categories are indicated for any one of parameters. In other cases, it is determined that the permit is possible to be divided.

Figure 14:
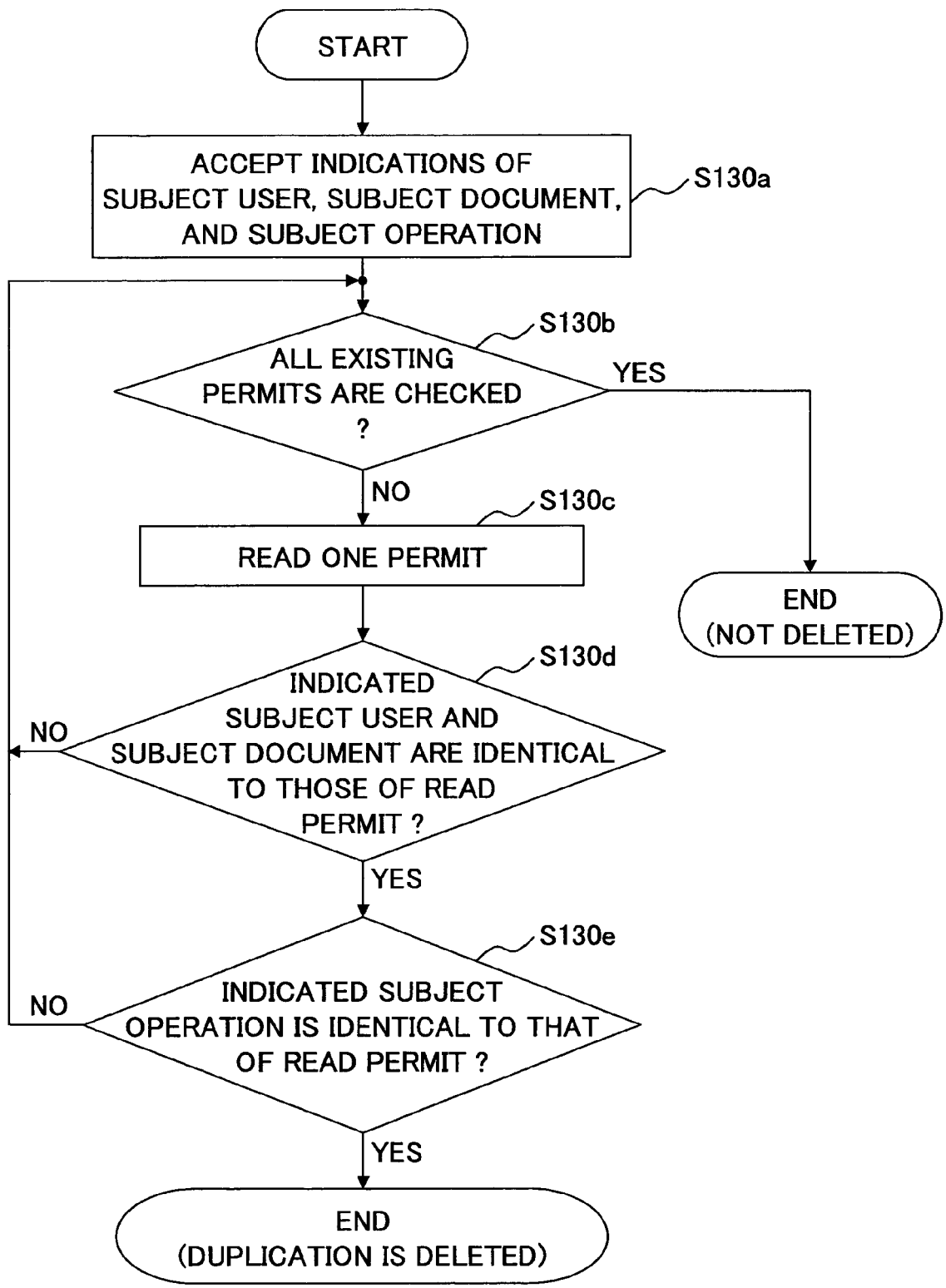
FIG. 14 is a flowchart for explaining a permit duplication detection process conducted by a permit duplication detecting part according to the first embodiment of the present invention.

Next, the permit duplication detection process in the step S130 in FIG. 11 will be described in detail. FIG. 14 is a flowchart for explaining the permit duplication detection process conducted by the permit duplication detecting part according to the first embodiment of the present invention.

In step S130a, the permit duplication detecting part 118 accepts indications of the subject user, the subject document, and the subject operation with respect to the requested permit. In steps S130b through S130e after the step S130a, a loop process is conducted for each permit, which has already been registered in the permit management table 120. First, it is determined whether or not all existing permits are checked (step S130b). When it is determined that all existing permits are checked, the permit duplication detection process is terminated. On the other hand, when it is determined that all existing permits are not checked, the permit duplication detection process advances to step S130c. Then, one permit is read out from the permit management table 120 (hereinafter, the permit read out from the permit management table 120 is called a current permit) (step S130c) Then, the permit duplication detecting part 118 determines whether or not the subject user and the subject document indicated for the requested permit are identical to the subject user and the subject document of the current permit (step S130d). When indicated for the requested permit are identical to the subject user and the subject document of the current permit, the permit duplication detecting part 118 determines whether or not the subject operation indicated for the requested permit is identical to the subject operation of the current permit (step S130e). When the subject operation indicated for the requested permit is identical to the subject operation of the current permit, it is determined that the application subject of the requested permit is duplicated with the application subject of the current permit, and the permit duplication detecting part 118 outputs a process result showing that the duplication of the permit is detected.

On the other hand, when at least one of the subject document and the subject operation indicated for the requested permit is not identical to that of the current permit (No of step S130d or No of step S130e), the permit duplication detecting part 118 goes back to the step S130b to read out a next permit. When no duplication is detected with respect to any permit managed in the permit management table 120, that is, when all existing permits are checked (Yes of the step S130b), the permit duplication detecting part 118 outputs a process result showing that the duplication of the permit is not detected.

As described above, according to the security management server 10 in the first embodiment of the present invention, it is allowed to issue the permit by a minimum unit in that the application subject is set for a single user category, a single document category, and a single operation type. Therefore, the duplication of the application subject among the permits does not occur, and it is not required to adjust the priority among the permits when the permission is determined by using the permit.

In a case in that the application subject is specified by a user name or a user ID, and a document name or a document ID, instead of specifying the subject user and the subject document by the user category and the document category, that is, in a case in that it is allowed to issue the permit indicating a single specific user (for example, "user A") and a single specific document (for example, "document 1") as the application subject, the permit may be issued. In this case, among the permit indicating the single specific user ("user A") and the single specific document ("document 1") and other permit indicating the user category to which the user A belongs, and the document category to which the document 1 belongs, the application subject may be duplicated. The priority order of these permits may be adjusted so that the priority order of the permit indicating the single specific user ("user A") and the single specific document ("document 1") is set to be a higher priority. That is, in a point in that the user and the document are specified to limit a range of the permit, it can be recognized that the former permit has higher superiority than the latter permits in the permit determination with respect to the user and the document.

In the first embodiment of the present invention, it is possible to overcome the duplication among the permits. However, in a case in that anyone of the subject user, subject document, and the subject operation is included in more than one category, the permit cannot be issued. Accordingly, in a second embodiment of the present invention, it is allowed to issue a permit indicating a plurality of categories regarding the application subject (a user, a document, and an operation), and duplication among the permits, which are issued while indicating the plurality of categories, is adjusted.

[Second Embodiment]

Figure 15:
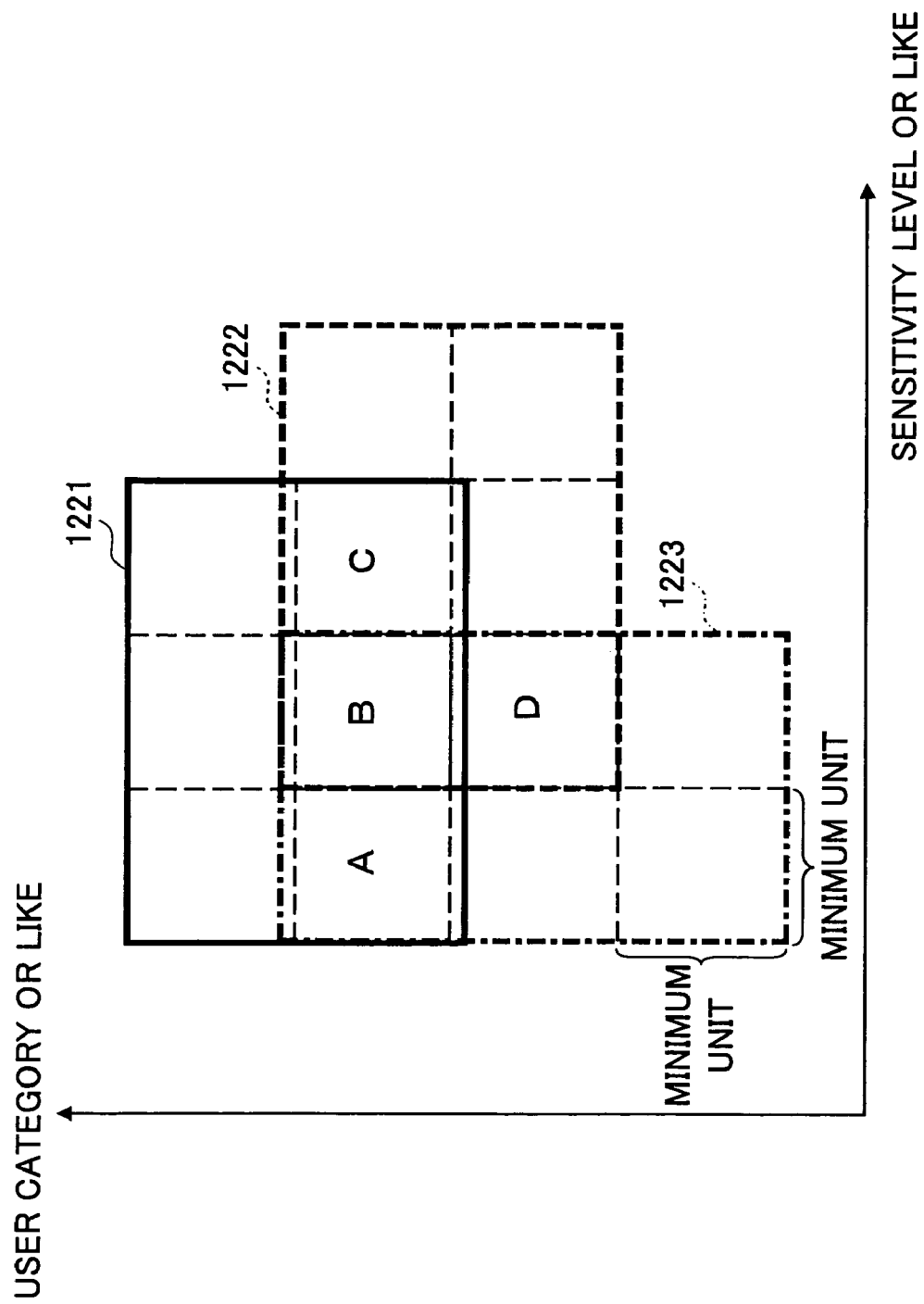
FIG. 15 is a diagram for explaining a principle of a permit issuance process according to a second embodiment of the present invention.

FIG. 15 is a diagram for explaining a principle of a permit issuance process according to the second embodiment of the present invention. In FIG. 15, application subjects of three permits 1221, 1222, and 1223 are partially duplicated with each other. That is, the permit 1221 and the permit 1223 are duplicated in a region A, three permits 1221, 1222, and 1223 are duplication in a region B, the permit 1221 and 1222 are duplication in a region C, and the permits 1222 and 1223 are duplicated in a region D.

Since it is allowed to issue the permit indicating more than one category, these duplications easily occur. Accordingly, in the second embodiment, for each combination of the user categories of the subject user, the document category of the subject document, and the type of the subject operation, each permit is divided into permits formed as minimum unit in that each permit indicates a single user category of the subject user, a single document category of the subject document, and a single type of the subject operation as the application subject. Then, the priority order is defined among the permits formed as the minimum unit. Therefore, it is possible to set a different priority for each of the ranges A, B, C, and D.

Figure 16:
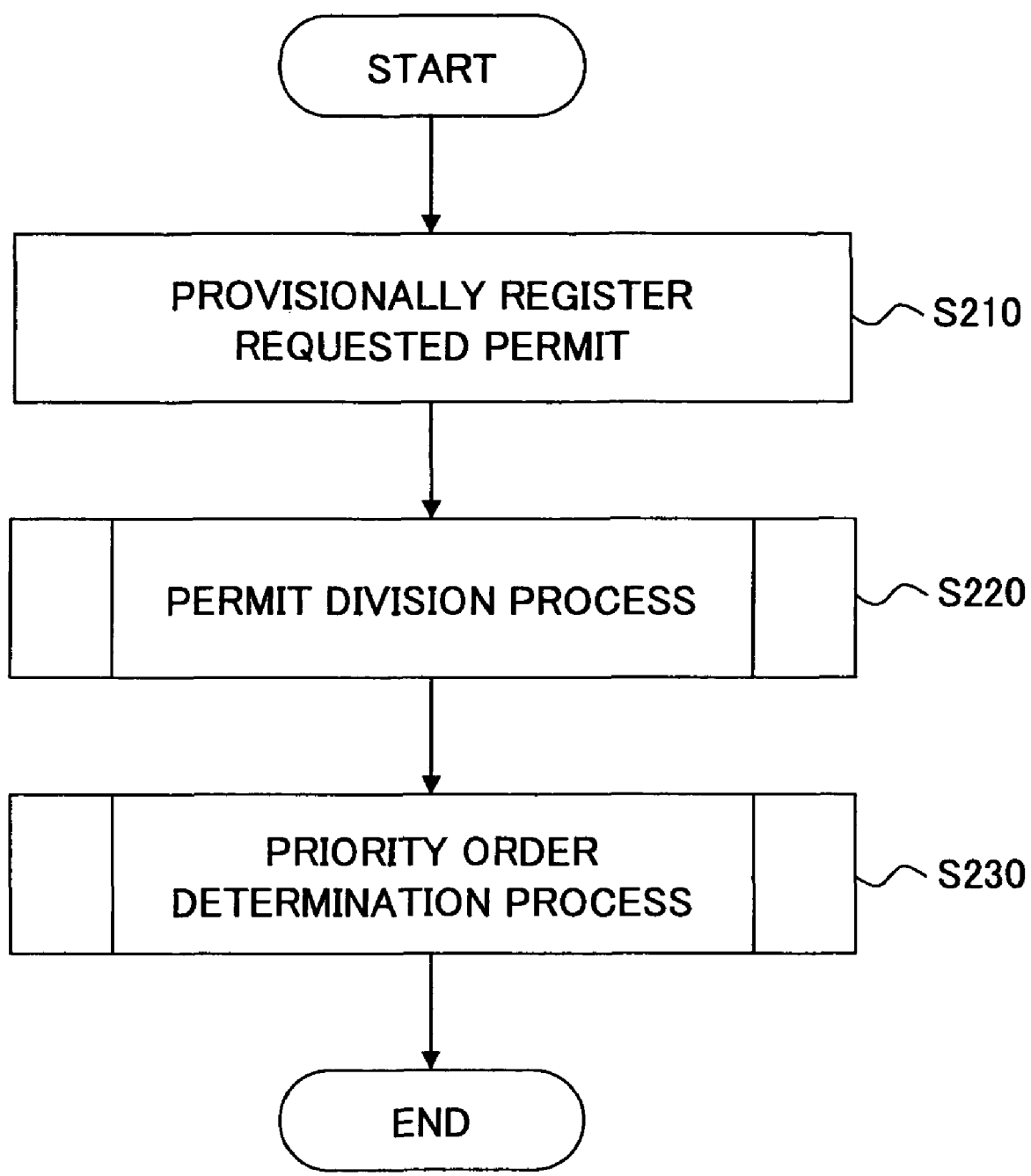
FIG. 16 is a flowchart for explaining the permit issuance process conducted by the security management server according to the second embodiment of the present invention.

FIG. 16 is a flowchart for explaining the permit issuance process conducted by the security management server according to the second embodiment of the present invention. Similar to the flowchart in FIG. 11, the flowchart in FIG. 16 shows a process after the security service layer 111, which accepted the permit issuance request from the application 41, instructs the permit issuing part 115 to issue a permit. It should be noted that the permit issuance request indicates the subject user, the subject document, the subject operation, and the like of a permit being requested to issue (hereinafter, called a requested permit) based on respective categories.

In step S210, the permit issuing part 115 provisionally registers the requested permit, in which the subject user, the subject document, and the subject operation indicated by the permit issuance request are determined as the application subject, to the permit management table 120. FIG. 17 is a diagram showing a configuration of the permit management table according to the second embodiment of the present invention. The permit management table 120b shown in FIG. 17 includes items of a permit ID, a subject user, a subject document, a subject operation, a request originator ID, issued date, other attributes, a group ID, a priority order, and a like. In the permit management table 120b, one record corresponds to one permit.

The permit ID is used to identify each permit. The subject user, the subject document, and the subject operation are the same as those in the first embodiment, and the explanation thereof will be omitted. For example, the request originator ID is used to identify a request originator of the permit issuance such as the application 41. The issued date shows a date (and time) when the permit is registered to the permit management table 120b. The other attributes show other attributes such as permit expiration, and a like. The group ID is associated with each of a plurality of permits, which are portions into which the permit is divided. In a case in that the application subject of the permit is duplicated with the application subjects of other permits, the priority order is used to regulate how to prioritize the permit and the other permits. It should be noted that in the permit management table 120b, it is assumed that a permit showing "B0" as the permit ID (hereinafter, called a permit B0) is the requested permit provisionally registered in the step S210.

The permit issuance process advances to step S220 following the step S210. In the step S220, in response to an instruction from the permit issuing part 115, the permit division processing part 116 divides the requested permit into permits formed as minimum units. The permit issuance process advances to step S230 following the step S220, based on an instruction from the permit issuing part 115, the permit priority order processing part 117 determines the priority order for permits (hereinafter, called divided permits), which are part of the permits divided from the request permit and which application subjects are duplicated with the application subjects of existing permits.

Figure 18:
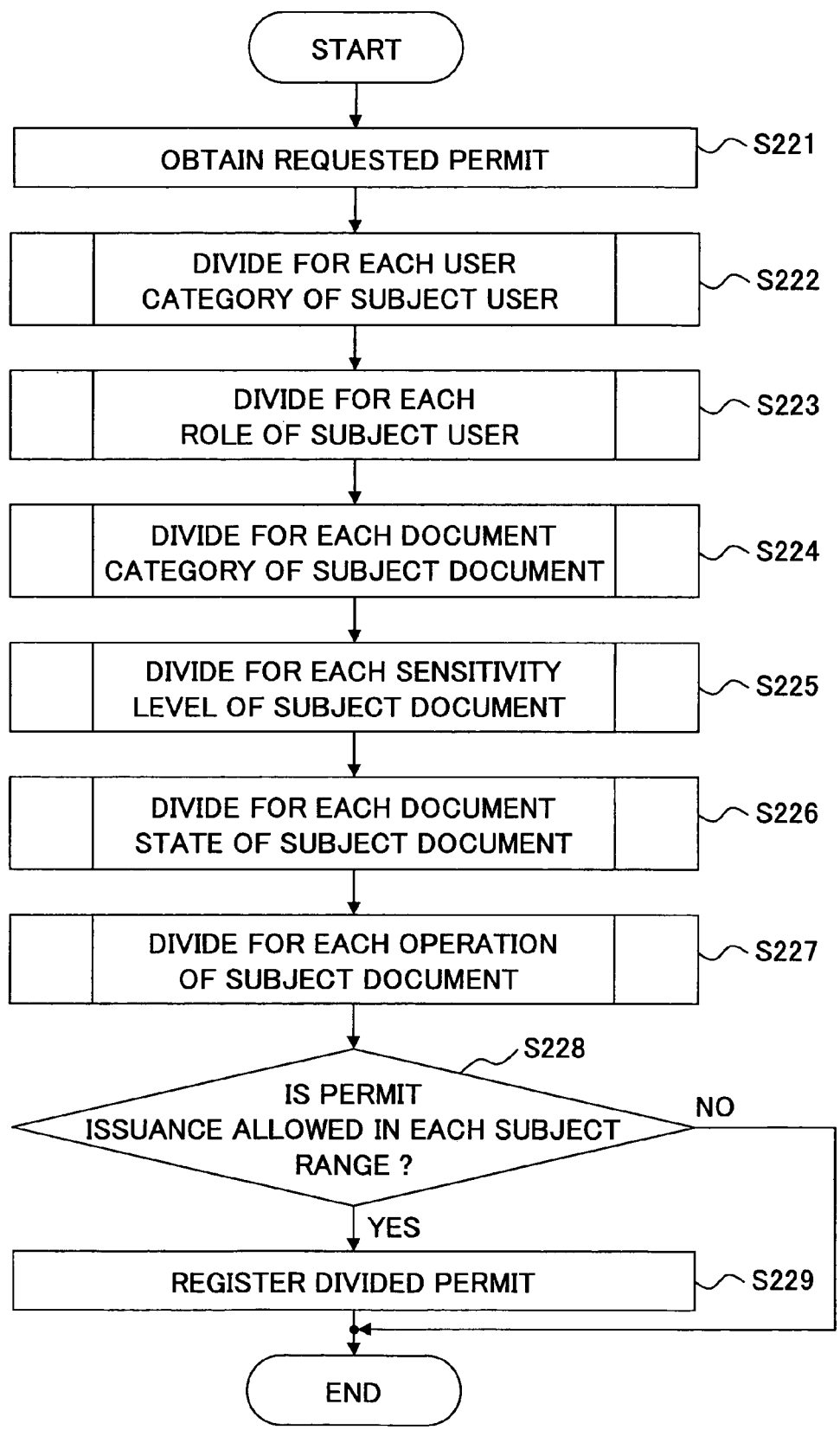
FIG. 18 is a flowchart for explaining the permit division process conducted by the permit division processing part according to the second embodiment of the present invention.

Next, a permit division process conducted in the step S220 will be described in detail. FIG. 18 is a flowchart for explaining the permit division process conducted by the permit division processing part according to the second embodiment of the present invention.

First, the requested permit provisionally registered in the permit management table 120b is obtained from the permit management table 120b (step S221). Subsequently, the requested permit is divided for each user category of the subject user based on an indication of the subject user, and the divided permits for each user category to which the subject user is classified (step S222). Next, based on the indication of the subject user, each divided permit is further divided for each user category of the subject user, so that further divided permits are generated (step S223). After that, similarly, each divided permit generated in previous steps is further divided into smaller divided permits for each document category of the subject document, each sensitivity level of the subject document, each document state of the subject document, and each operation type of the subject document, and smaller divided permits are generated (step S224, S225, S226, and S227).

The permit division process advances to step S228 following the step S227, it is checked whether or not a permit issuance is allowed for the application subject of each divided permit. For example, in a case in that the policy 114 defines whether or not the permit issuance is allowed, for each operation corresponding to a combination of the user category and the document category, the permit issuance may be determined based on the definition described in the policy 114. If the permit issuance is not allowed, the divided permit is not registered to the permit management table 120b. On the other hand, when the permit issuance is allowed, each divided permit is registered to the permit management table 120b (step S229). When each divided permit is registered, a permit ID is provided to each divided permit, and also a group ID shared with all divided permits is assigned to the requested permit, which is an original permit. And the request originator ID, the issued date, and the like are recorded.

Figure 19:
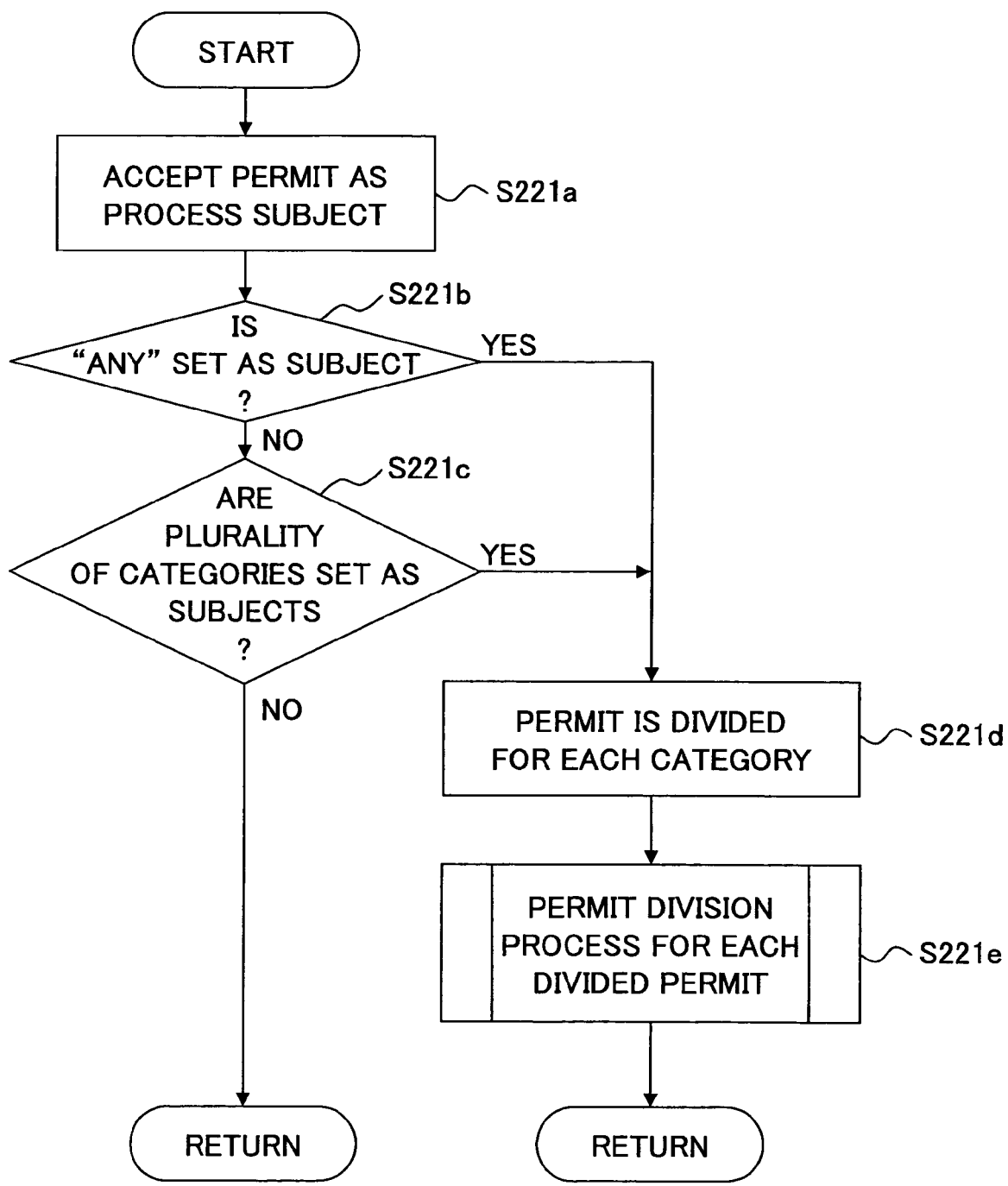
FIG. 19 is a flowchart for explaining the division process for each parameter, according to the second embodiment of the present invention.

Next, a division process, which is conducted in each of steps S222 through S227 based on respective parameter, will be described. FIG. 19 is a flowchart for explaining the division process for each parameter, according to the second embodiment of the present invention.

First, a permit to be a process subject is accepted as input information (step S221a). In this case, the current permit is the requested permit before the requested permit is divided. After the step S221a, the current permit is one of divided permits generated in the previous steps. The division process advances to step S221b following the step S221a, and determines whether or not "ANY" is set as a subject (subject user, subject document, or subject operation) for a parameter of a standard to divide the current permit. The parameter is the user category in the step S222, and hereinafter, the parameter is called a current parameter.

When "ANY" is not set as the subject for the current parameter, the division process advances to step S221c, and determines whether or not a plurality of categories are set as the subject for the current parameter. When the plurality of categories are not set as the subject for the current parameter, since the permit is not divided based on the current parameter, the division process is returned without dividing the permit. On the other hand, when "ANY" is set as the subject for the current parameter (Yes of step S221b), or when the plurality of categories are set as the subject for the current parameter (Yes of step S221c), the current permit is divided for each category of the subject (step S221d), and then the permit division process shown in FIG. 18 is recursively conducted for each of divided permits divided from the current permit (step S221e).

By conducting the permit division process shown in FIG. 18 and the division process shown in FIG. 19, contents of the permit management table 120b are changed as shown in FIG. 20. FIG. 20 is a diagram showing the permit management table after the requested permit is divided, according to the second embodiment of the present invention. In the permit management table 120c in FIG. 20, the permit B0 in the permit management table 120b is divided into four permits (permits B1 through B4) indicated by a reference sign B. That is, regarding the subject user of the permit B0, "ANY" is set as the user category, and regarding the subject document of the permit B0, "SECRET" and "INTERNAL USE ONLY" are set as the sensitivity level. Thus, the permit is divided into two permits in which the related parties and the outside parties are subjects, respectively, by referring to the user category. Each of the two permits is further divided into two permits in which the secret and the internal use only are subjects, respectively, by referring the sensitivity level. The same group ID "B" is assigned to divided permits so that the divided permits are associated with each other. Accordingly, it is possible to recognize that the divided permits are originally divided from a single requested permit.

Figure 21:
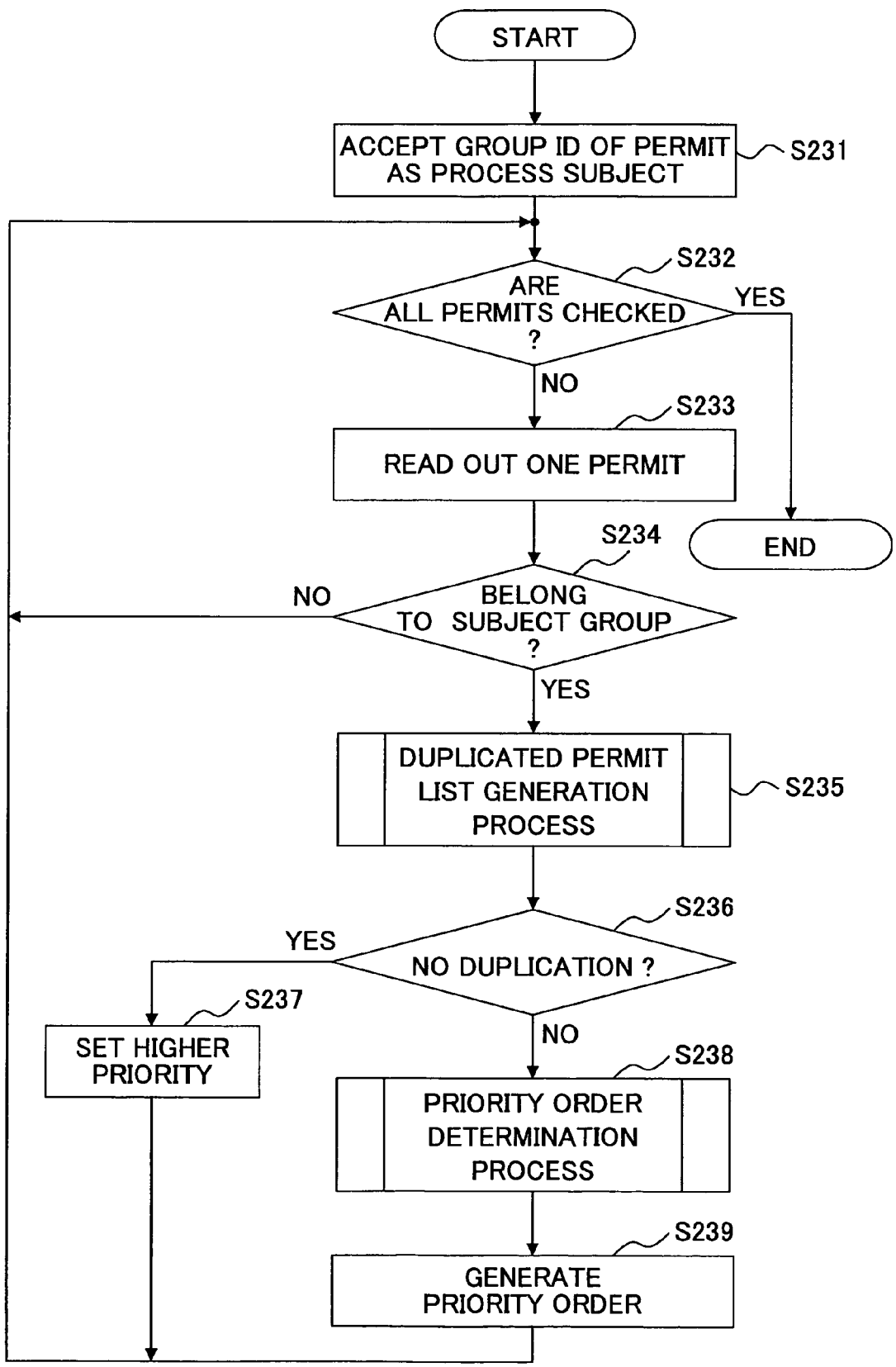
FIG. 21 is a flowchart for explaining the priority order determination process for the permit conducted by the permit priority order determining part according to the second embodiment of the present invention.

Next, the priority order determination process for the permit conducted in the step S230 in FIG. 16 will be described in detail. FIG. 21 is a flowchart for explaining the priority order determination process for the permit conducted by the permit priority order determining part according to the second embodiment of the present invention.

In step S231, the group ID of a group (hereinafter, called a subject group) to which the permit newly registered to the permit management table 120b is accepted as input information. Steps S232 through S239 after the step S231 conduct a loop process for each permit, which has already been registered in the permit management table 120b. First, it is determined whether or not all permits registered in the permit management table 120b are checked. When it is determined that all permits registered in the permit management table 120b are checked, the priority order determination process is terminated. On the other hand, when it is determined that all permits registered in the permit management table 120b are not checked, the priority order determination process advances to step S233. Then, one permit (one record) is read out from the permit management table 120b (step S233). Hereinafter, the permit read out from the permit management table 120b is called a current permit. Then, it is determined whether or not the group ID of the current permit is identical to the group ID of the subject group (step S234). When both group IDs are not identical to each other, since the current permit does not belong to the subject group, the priority order determination process goes back to the step S232 to set a next permit as the process subject. On the other hand, when both group IDs are identical to each other, the current permit belongs to the subject group. That is, since the permit as the process subject is the divided permit divided from the requested permit the priority order determination process advances to step S235, and the current permit and a list showing permits which application subjects are duplicated are generated by the permit duplication detecting part 118 (duplicated permit list generation process). Hereinafter, the list is called a duplicated permit list.

When the duplicated permit list is generated by the permit duplication detecting part 118, a presence of the duplication is determined based on the duplicated permit list (step S236). When no permit is shown in the duplicated permit list (Yes of step S236), since it is determined that a duplication of the application subject does not occur among the permits, a hither priority is set to the current permit, the higher priority is registered to the permit management table 120 for the current permit (step S237). On the other hand, when the duplicated permit list includes permits, the priority order is determined among the permit included in the duplicated permit list and the current permit (step S238), and priorities are registered to the permit management table 120b by corresponding to the permits included in the duplicated permit list (step S239). After the priority order is registered in the step S237 or S239, the priority order determination process goes back to the step S232 to set a next permit as the process subject. When all permits registered in the permit management table 120b are checked, the priority order determination process is terminated.

Figure 22:
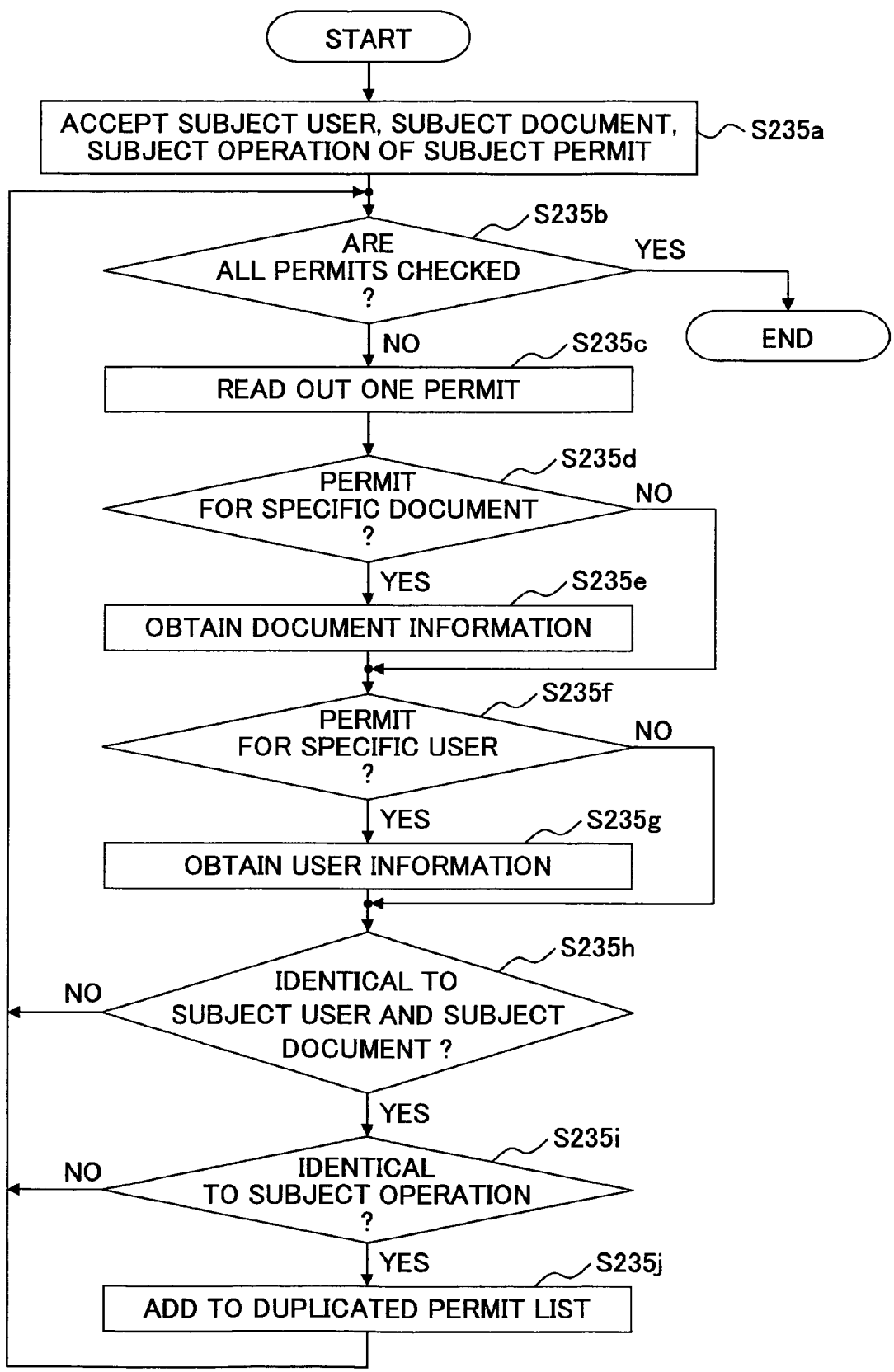
FIG. 22 is a flowchart for explaining the duplicated permit list generation process conducted by the permit duplication detecting part according to the second embodiment of the present invention.

Next, the duplicated permit list generation process conducted in the step S235 in FIG. 21 will be described in detail. FIG. 22 is a flowchart for explaining the duplicated permit list generation process conducted by the permit duplication detecting part according to the second embodiment of the present invention.

In step S235a, the subject user, the subject document, the subject operation, and the like of a permit, which is to be a subject of the duplicated permit list, are accepted as input information. Hereinafter, the permit is called a subject permit. Steps S235b through S235j after the step s235a, a loop process is conducted for each permit registered in the permit management table 120b. First, it is determined whether or not all permits are checked (step S235b). When it is determined that all permits are checked, the duplicated permit list generation process is terminated. On the other hand, it is determined that all permits are not checked, the duplicated permit list generation process advances to step S235c. Then, one permit is read from the permit management table 120b (step S235c). It is determined whether or not the current permit is for a specific document (step S235d). That is, when the subject document of the current permit is not classified by a parameter of the sensitivity level, a document category, or a like but is indicated by information for identifying a document such as a document name, a document ID, or a like, it is determined that the current permit is a permit for one or more specific documents. After the duplicated permit list generation process obtains the document information concerning various attributes (sensitivity level, document category, document state, and the like) of the subject document of the current permit from the document management service 21 (step S235e), the duplicated permit list generation process advances to step S235f. By obtaining the document information concerning various attributes of the subject document, it is possible to specify categories to which the subject document is classified. On the other hand, when the current permit is not for the specific document, the duplicated permit list generation process advances to step S235f without conducting the step S235e.

In step S235f, it is determined whether or not the current permit is for the specific document. That is, when the subject user of the current permit is not classified by a parameter of the user category or the role but is indicated by information for identifying each user such as a user name, a user ID, or a like, it is determined that the current permit is for one or more specific users. After the duplicated permit list generation process obtains user information concerning various attributes (section, role, and a like) of the subject user of the current permit from the certificate service 31 (step S235g), the duplicated permit list generation process advances to step S235h. By obtaining the user information concerning the various attributes of the subject user, it is possible to specify the categories of the subject user. On the other hand, when the current permit is not for the specific user, the duplicated permit list generation process advances to step S235h without conducting the step S235g.

In step S235h, it is determined whether or not the subject user and the subject document of the current permit correspond to a subject user and a subject document indicated for the subject permit. When the subject user or the subject document of the current permit corresponds to a specific user or a specific document, the subject user or the subject document indicated for the subject permit is compared with the document information obtained in step S235e or the user information obtained in step S235g. If there are more than one specific user, and at least if a category to which one user belongs and a category to which one document belongs correspond to the subject user and the subject document of the current permit, it is determined that the subject user and the subject document of the current permit correspond to the subject user and the subject document of the subject permit.

When the subject user and the subject document of the current permit correspond to the subject user and the subject document indicated for the subject permit, it is further determined whether or not the subject operation of the subject permit corresponds to the subject operation of the current permit (step S235i). When the subject operation of the subject permit corresponds to the subject operation of the current permit, it is determined that the application subject of the subject permit is duplicated with the application subject of the current permit, and the current permit is added to the duplicated permit list (S235j).

On the other hand, when at least one of the subject user, the subject document, and the subject operation, which are indicated for the subject permit, does not correspond to one of those of the current permit (No of step S235h or No of step S235i), the duplicated permit list generation process goes back to the step S235b to set a next permit as the process subject. When all permits registered in the permit management table 120b are checked, the duplicated permit list generation process is terminated.

Next, the priority order determination process conducted in the step S238 in FIG. 21 will be described. The priority order determination process can be realized by various methods. For example, the priority order may be determined for the permits included in the duplicated permit list and a permit (subject permit) set as a subject for the duplicated permit list, by comparing request originator IDs with each other. That is, the priority order among systems conducting a permit issuance request to the security service 11 through the application 41 and the like can be applied to the priority order for the above-described permits.

Moreover, the priority order may be determined in accordance with an order of the issued date of the permits. Alternatively, the priority order can be determined based on each obligation of the permits. That is, the priority order is defined beforehand among various obligations, and the priority order itself is applied to a priority order among the permits. In either case, the permit showing the specific user as the subject user or the specific document as the subject document is set to be a highest priority. It is appropriate to apply the permit when permission is determined for the specific user or the specific document.

Furthermore, a user interface for setting the priority order may be provided to a user, and the user may define the priority order by using the user interface. FIG. 23 is a diagram showing a display example of a priority order setting screen according to the second embodiment of the present invention. For example, the security service 11 sends information concerning the subject permit and the duplicated permit list to the application 41, and then, the application 41 displays a priority order setting screen 41 based on the information received from the security service 11.

The priority order setting screen 410 includes a duplicated permit list display area 411, a subject permit display area 412, and a like. The duplicated permit list display are 411 is an area for displaying information concerning the permits included in the duplicated permit list. The subject permit display area 412 is an area for displaying information concerning the subject permit. In the duplicated permit list display area 411, insertion position determination buttons 413 are assigned to each permit. The insertion position determination buttons 413 are used to set the priority order so as to prioritize the subject permit shown in the subject permit display area 412 to be one level higher than a priority of a permit to which one button 413 is set to be ON.

On the priority order setting screen 410, when one of the insertion position determination buttons 413 is selected by the user and an OK button 414 is clicked by the user, the permit ID of a permit selected by the insertion position determination button 413 is sent to the security service 11 by the application 41. The permit priority order processing part 117 of the security service 111 determines the priority order of the subject permit based on the permit ID received from the application 41, and registers the priority order of the subject permit to the permit management table 120b based on a determination result.

As described above, in the security management server 10 according to the second embodiment of the present invention, when a permit, in which a subject, it is requested to generate a resource, or an operation is included in a plurality of categories or types, the permit is divided into a plurality of permits in that a subject to provide is formed to be the minimum unit. It is possible to detect duplication by a further detailed unit of the permit, and it is also possible to set the priority order for each unit of the permit. Accordingly, when the application subject of the permit is duplicated, it is possible to flexibly adjust the priority order among the permits.

[Third Embodiment]

Recently, a CPU has been mounted to an embodied apparatus specifying a certain special function and realizing a function by software similar to a computer. For example, the embodied apparatus is called a multi-functional apparatus, or a combined apparatus. An image forming apparatus including a plurality of applications functioning as a printer, a copier, a facsimile, and a like corresponds to the embodied apparatus. The embodied apparatus also needs a security function.

Accordingly, the present invention can be applied to the embodied apparatus. FIG. 24 is a diagram showing a configuration of a apparatus implementing various services according to a third embodiment of the present invention. In FIG. 24, parts that are the same as those shown in FIG. 4 are given the same reference numbers, and the explanation thereof will be omitted.

In FIG. 24, an apparatus 500 includes an operation panel 501, a scanner part 502, and a printer part 503. Also, the apparatus 500 include a security service 11, a document management service 21, a certificate service 31, and a like. That is, the apparatus 500 corresponds to an apparatus in that functions distributed to the security management server 10, the document management server 20, and the certificate server 30 in the documents management system 1 shown in FIG. 4 are implemented in a single chassis.

The apparatus 500 can manage a document, which is scanned by the scanner part 502, in the document management service 21, and can print out the document being managed in the document management service 21 by the printer part 503.

Since the apparatus 500 has the above-described configuration, it is possible to suppress an issuance of the permit in which the application subject is duplicated. Also, when the application subject of the permit is duplicated, it is possible to properly determine the permit to apply. In the latter case, the priority order setting screen 410 may be displayed at the operation panel 501 to allow the user to set the priority order of the permit by using the operation panel 501.

The present invention is not limited to the specifically disclosed embodiments, and variations and modifications may be made without departing from the scope of the present invention.

The present application is based on the Japanese Priority Applications No. 2004-134403 filed on Apr. 28, 2004 and No. 2005-044527 filed on Feb. 22, 2005, the entire contents of which are hereby incorporated by reference.

What is claimed is:

1. An information processing apparatus for processing an operation permission, which is referred to in a permission determination of an operation with respect to an application subject, comprising:

an operation permission managing part configured to manage the operation permission; and an operation permission generating part configured to generate one operation permission in response to a permission issuance request for requesting an issuing the operation permission in which the permission issuance request indicates one or more user categories of a subject user, one or more categories of a resource which is a subject document, and one or more types of a subject operation to be the application subject, and to register the one operation permission to the operation permission managing part, said operation permission generating part includes:

a dividing part configured to divide the one operation permission generated in response to the permission issuance request into a plurality of ranges, which are combinations from the one or more categories of the subject user, the one or more categories of the resource which is the subject document, and the one or more types of the subject operation, each being a minimum unit; and a priority order setting part configured to set a priority order to conduct an access control among existing operation permissions managed by the operation permission managing part and the operation permission requested by the permission issuance request, for each of the plurality of ranges each being the minimum unit into which the application subject is divided.

2. The information processing apparatus as claimed in claim 1, further comprising:

a registration part configured to register the operation permission generated in response to the permission issuance request with the priority order to the operation permission managing part, for each of the plurality of ranges each being the minimum unit; and an application determining part configured to determine one operation permission to be applied for the access control from a plurality a operation permissions registered for one range being the minimum unit in accordance with the priority order.

3. The information processing apparatus as claimed in claim 1, wherein said dividing part is configured to make combinations with each of categories or each of types to form the ranges when the permission issuance request indicates all categories or all types for at least one of the subject user, the resource, and the operation.

4. The information processing apparatus according to claim 1, wherein:

the operation permission specifies the application subject for the operation permission based on a subject user of the operation, a resource to be a subject for the operation, and a type of the operation.

5. The information processing apparatus as claimed in claim 4, wherein the operation permission generating part generates the operation permission in which a single category of the subject user, a single category of the resource, and a single type of the operation are indicated as the application subject for each combination.

6. The information processing apparatus as claimed in claim 1, further comprising:

a duplication detecting part detecting a duplication of the application subject with an existing operation permission, with respect to the operation permission for each combination.

7. The information processing apparatus as claimed in claim 6, wherein when the subject user, the resource, and the operation, which specify the application subject of the existing operation permission, are partially classified into the category of the subject user, the category of the resource, and the type of the operation, which specify the application of the operation permission generated by the operation permission generating part, the duplication detecting part determines that the application subjects of both the operation permissions are duplicated with each other.

8. The information processing apparatus as claimed in claim 6, wherein the priority order setting part sets the priority order for the permission determination for each of the operation permission generated by the operation permission generating part, and the existing operation permission in which the duplication of the application subject is detected with respect to the operation permission by the duplication detecting part, based on a priority order for each request originator of the permission issuance request.

9. The information processing apparatus as claimed in claim 8, wherein the priority order setting part sets the priority order based on an order of generation of the operation permissions.

10. The information processing apparatus as claimed in claim 8, wherein:

the operation permission includes obligation information showing contents of an obligation required to be conducted when the operation is conducted; and the priority order setting part sets the priority order based on the obligation information.

11. The information processing apparatus as claimed in claim 8, wherein the priority order setting part sets a priority of the operation permission in which a specific subject or a specific resource is indicated as the application subject, to be higher than priorities of other operation permission.

12. The information processing apparatus as claimed in claim 11, wherein the priority order setting part sets the priority of the operation permission in which a single specific subject or a single specific resource are indicated as the application subject, to be higher than the priorities of the other operation permissions.

13. The information processing apparatus as claimed in claim 8, further comprising:

a priority order setting screen displaying part displaying a priority order setting screen allowing a user to set the priority order for the operation permission generated by the operation permission generating part, and the existing operation permission in which the duplication of the application subject is detected with respect to the operation permission by the duplication detecting part, wherein the priority order setting part sets the priority of the operation permission based on information set by the user using the priority order setting screen.

14. The information processing apparatus as claimed in claim 6, wherein when the duplication detecting part detects the duplication of the application subject, and the permission issuance request indicates a specific subject user, a specific resource, and a type of the operation as the application subject, even if the operation permission, in which a category of the subject user to which the specific subject user belongs, a category of the resource to which the specific resource belongs, and the type of the operation are the application subject, has been registered to the operation permission management part, a generation of a new operation permission is allowed.

15. The information processing apparatus as claimed in claim 1, wherein the operation permission generating part additionally provides identification information to each of the operation permissions, which is generated for the each combination, the identification information which is provided to each of the operation permissions being a same identification information.

16. An operation permission processing method used with an information processing apparatus for processing an operation permission, which is referred to in a permission determination of an operation with respect to an application subject, comprising:

managing the operation permission; and generating one operation permission in response to a permission issuance request for requesting an issuing of the operation permission in which the permission issuance request indicates one or more categories of a subject user, one or more categories of a resource which is a subject document, and one or more types of a subject operation to be the application subject, and registering the one operation permission to the managing of the operation permission, said generating including:

dividing the one operation permission generated in response to the permission issuance request into a plurality of ranges which are combinations from the one or more categories of the subject user, the one or more categories of the resource which is the subject document, and the one or more type of the subject operation, each being a minimum unit; and setting a priority order, by a computing device, to conduct an access control among existing operation permissions being managed and the operation permission requested by the permission issuance request, for each of the plurality of ranges each being the minimum unit into which the application subject is divided.

17. The method of claim 16, further comprising:

registering the operation permission generated in response to the permission issuance request with the priority order, for each of the plurality of ranges each being the minimum unit; and determining one operation permission to be applied for the access control from a plurality of operation permissions registered for one range being the minimum unit in accordance with the priority order.

18. The method of claim 16, wherein:

said dividing operates to make combinations with each of categories or each of types to form the ranges when the permission issuance request indicates all categories.

19. The operation permission processing method as claimed in claim 16, wherein the setting of the priority order sets a priority for the existing operation permission in which the application subject is detected with respect to the operation permission.

20. The operation permission processing method as claimed in claim 19, further comprising:

displaying a priority order setting screen for a user to set the priority order for the operation permission which has been generated, wherein the priority order is set for the operation permission based on information set to the priority order setting screen.

21. A non-transitory tangible computer-readable recording medium having recorded thereon code for causing a processor to process an operation permission, which is referred to in a permission determination of an operation with respect to an application subject by performing:

managing the operation permission; and generating one operation permission in response to a permission issuance request for requesting an issuing of the operation permission in which the permission issuance request indicates one or more categories of a subject user, one or more categories of a resource which is a subject document, and one or more types of a subject operation to be the application subject, and registering the one operation permission to the managing of the operation permission, said generating including:

dividing the one operation permission generated in response to the permission issuance request into a plurality of ranges which are combinations from the one or more categories of the subject user, the one or more categories of the resource which is the subject document, and the one or more type of the subject operation, each being a minimum unit; and setting a priority order to conduct an access control among existing operation permissions being managed and the operation permission requested by the permission issuance request, for each of the plurality of ranges each being the minimum unit into which the application subject is divided.

22. The non-transitory computer-readable recording medium of claim 21, wherein the processor further performs:

registering the operation permission generated in response to the permission issuance request, for each of the plurality of ranges each being the minimum unit; and determining one operation permission to be applied for the access control from a plurality of operation permissions registered for one range being the minimum unit in accordance with the priority order.

23. The non-transitory computer-readable recording medium of claim 21, wherein:

said dividing operates to make combinations with each of categories or each of types to form the ranges when the permission issuance request indicates all categories.

24. The non-transitory computer-readable recording medium of claim 21, wherein the setting of the priority order sets a priority for the existing operation permission in which the application subject is detected with respect to the operation permission.

25. The non-transitory computer-readable recording medium of claim 24, wherein the processor further performs:

displaying a priority order setting screen for a user to set the priority order for the operation permission which has been generated, wherein the priority order is set for the operation permission based on information set to the priority order setting screen.

* * * * *